US010766304B2

(12) United States Patent
Tarutani

(10) Patent No.: US 10,766,304 B2
(45) Date of Patent: *Sep. 8, 2020

(54) POLYAMIDE-BASED THERMOPLASTIC ELASTOMER AND TIRE

(71) Applicant: BRIDGESTONE CORPORATION, Tokyo (JP)

(72) Inventor: Yasunori Tarutani, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 15/564,046

(22) PCT Filed: Apr. 6, 2016

(86) PCT No.: PCT/JP2016/061307
§ 371 (c)(1),
(2) Date: Oct. 3, 2017

(87) PCT Pub. No.: WO2016/163425
PCT Pub. Date: Oct. 13, 2016

(65) Prior Publication Data
US 2018/0086140 A1 Mar. 29, 2018

(30) Foreign Application Priority Data
Apr. 10, 2015 (JP) ................. 2015-081098

(51) Int. Cl.
*B60C 1/00* (2006.01)
*B60C 5/01* (2006.01)
*C08G 69/26* (2006.01)
*C08K 7/02* (2006.01)
*C08L 77/06* (2006.01)
*C08G 69/40* (2006.01)

(52) U.S. Cl.
CPC ................. *B60C 1/00* (2013.01); *B60C 5/01* (2013.01); *C08G 69/26* (2013.01); *C08G 69/40* (2013.01); *C08K 7/02* (2013.01); *C08L 77/06* (2013.01); *C08J 2300/22* (2013.01); *C08J 2300/26* (2013.01)

(58) Field of Classification Search
None
See application file for complete search history.

(56) References Cited

U.S. PATENT DOCUMENTS

| 4,024,116 | A | 5/1977 | Horn et al. |
| 4,438,240 | A | 3/1984 | Tanaka et al. |
| 4,740,582 | A | 4/1988 | Coquard et al. |
| 5,399,663 | A | 3/1995 | Clark, II |
| 5,574,128 | A | 11/1996 | Judas et al. |
| 2003/0162899 | A1 | 8/2003 | Baumann et al. |
| 2003/0173707 | A1 | 9/2003 | Becker et al. |
| 2005/0014842 | A1 | 1/2005 | Baumann et al. |
| 2009/0291288 | A1 | 11/2009 | Kopannia et al. |
| 2010/0282411 | A1 | 11/2010 | Nataniel et al. |
| 2013/0206301 | A1 | 8/2013 | Fudemoto et al. |
| 2014/0242370 | A1* | 8/2014 | Song ................. B29D 30/0681 428/220 |
| 2016/0046152 | A1 | 2/2016 | Fudemoto et al. |
| 2016/0152079 | A1 | 6/2016 | Machida et al. |
| 2016/0303905 | A1 | 10/2016 | Fudemoto et al. |
| 2017/0291991 | A1* | 10/2017 | Itoh ........................ C08G 69/40 |

FOREIGN PATENT DOCUMENTS

| CN | 86100176 A | 4/1987 |
| CN | 1434077 A | 8/2003 |
| CN | 1576317 A | 2/2005 |
| EP | 1518901 A2 | 3/2005 |
| EP | 3199567 A1 | 8/2017 |
| EP | 3202819 A1 | 8/2017 |
| JP | 61-225213 A | 10/1986 |
| JP | 63-35625 A | 2/1988 |
| JP | 63-105033 A | 5/1988 |
| JP | 63-183929 A | 7/1988 |
| JP | 2-031101 B2 | 7/1990 |
| JP | 7-102062 A | 4/1995 |
| JP | 2003-246926 A | 9/2003 |
| JP | 2004-352793 A | 12/2004 |
| JP | 2005-042111 A | 2/2005 |
| JP | 2005-319289 A | 11/2005 |
| JP | 2010-511082 A | 4/2010 |
| JP | 2012-046030 A | 3/2012 |
| JP | WO 2013/048206 A2 * | 4/2013 |
| JP | WO 2016/047708 A1 * | 3/2016 |
| WO | 2009/094127 A3 | 7/2009 |
| WO | 2013/154205 A1 | 10/2013 |
| WO | 2014/156741 A1 | 10/2014 |
| WO | 2014/175453 A1 | 10/2014 |

OTHER PUBLICATIONS

International Search Report for PCT/JP2016/061307 dated May 17, 2016 [PCT/ISA/210].
Written Opinion for PCT/JP2016/061307 dated May 17, 2016 [PCT/ISA/237].
Communication dated Mar. 21, 2018, from the European Patent Office in counterpart European Application No. 16776591.6.
"Block Copolyetheramides. II. Synthesis and Morphology of Nylon-6 Based Block Copolyetheramides", Journal of Polymer Science: Part A: Polymer Chemistry, 1992, vol. 30, pp. 951-953 (3 pages total).
Yajiao Hao et al., "Synthesis and Properties of Polyesteramides Having Short Nylon-610 Segments in the Main Chains through Polycondensation and Chain Extension", Ind. Eng. Chem. Res., 2013, vol. 52, pp. 6410-6421 (12 pages total).
P.F. van Hutten et al., "Segmented block copolymers based on polyamide-4,6 and poly(propylene oxide)", Polymer, Mar. 1990, vol. 31, pp. 524-529 (6 pages total).
Chinese Search Report of Office Action dated Jul. 23, 2019, from the State Intellectual Property Office of the P.R. of China in counterpart Application No. 2016800209531.

* cited by examiner

*Primary Examiner* — Ana L. Woodward
(74) *Attorney, Agent, or Firm* — Sughrue Mion, PLLC

(57) ABSTRACT

A polyamide-based thermoplastic elastomer including a hard segment and a soft segment, wherein the hard segment contains polyamide 612 and the soft segment contains a polyamine.

11 Claims, 10 Drawing Sheets

POLYAMIDE-BASED THERMOPLASTIC ELASTOMER AND TIRE

CROSS REFERENCE TO RELATED APPLICATIONS

This application is a National Stage of International Application No. PCT/JP2016/061307 filed Apr. 6, 2016, claiming priority based on Japanese Patent Application No. 2015-081098 filed Apr. 10, 2015, the contents of all of which are incorporated herein by reference in their entirety.

TECHNICAL FIELD

The present disclosure relates to a polyamide-based thermoplastic elastomer, and particularly to a polyamide-based thermoplastic elastomer suitably usable for a tire to be mounted on a rim, and a tire.

BACKGROUND ART

Conventionally, in a pneumatic tire used for a vehicle such as a passenger car, a tire using a resin material, particularly a thermoplastic resin, a thermoplastic elastomer, or the like as a material has been considered from the viewpoint of weight reduction, ease of molding, and easiness of recycling.

Such thermoplastic polymer materials (thermoplastic resins) are advantageous from the viewpoint of improving productivity such as injection moldability.

For example, it has been proposed to form a tire frame of a tire from a thermoplastic resin material, and to use a polyamide-based thermoplastic elastomer as the thermoplastic resin material (see Japanese Patent Application Laid-Open (JP-A) No. 2012-046030).

SUMMARY OF INVENTION

Technical Problem

A thermoplastic elastomer used for producing a resin molded product such as a tire is sometimes demanded to have high heat resistance and hygrothermal aging resistance. However, it has not been easy for a polyamide-based thermoplastic elastomer to attain both the heat resistance and the hygrothermal aging resistance at high quality.

In view of the above circumstances, an object of the disclosure is to provide a polyamide-based thermoplastic elastomer and a tire having both high heat resistance and hygrothermal aging resistance.

Solution to Problem

[1] A polyamide-based thermoplastic elastomer comprising a hard segment and a soft segment, wherein the hard segment contains polyamide 612 and the soft segment contains a polyamine.

Advantageous Effects of Invention

According to the present disclosure, a polyamide-based thermoplastic elastomer and a tire having both high heat resistance and hygrothermal aging resistance can be provided.

DESCRIPTION OF EMBODIMENTS

Figure 1A:
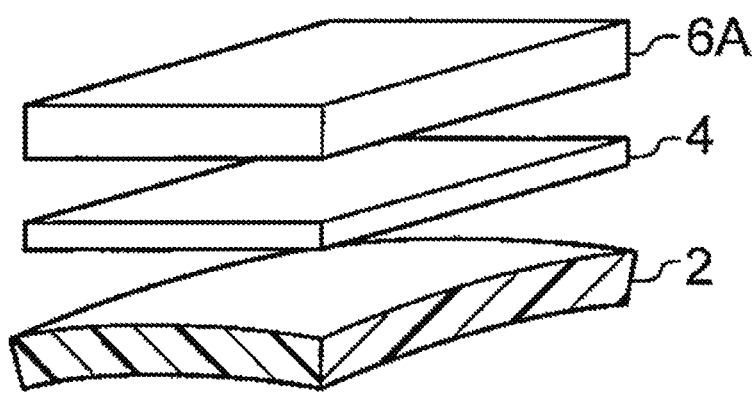
FIG. 1A is a schematic view illustrating an example of a layer configuration of a rubber member and a resin member.

The polyamide-based thermoplastic elastomer of the disclosure comprises a hard segment and a soft segment, wherein the hard segment contains polyamide 612 and the soft segment contains a polyamine.

Here, the term "polyamide-based thermoplastic elastomer" means a thermoplastic resin material composed of a copolymer including a polymer forming a hard segment which is crystalline and has a high melting point and a polymer forming a soft segment which is amorphous and has a low glass transition temperature, wherein the main chain of the polymer forming the hard segment has an amide bond (—CONH—).

In the disclosure, this hard segment contains polyamide 612, that is, the hard segment has a structure derived from polyamide 612. The soft segment contains a polyamine, that is, the soft segment has a structure derived from a polyamine.

The structure of "polyamide 612" can be represented by $\{HN-(CH_2)_6-NHCO-(CH_2)_{10}-CO\}_n$ (n represents an arbitrary number of repeating units), and for example, n is preferably from 2 to 100, and more preferably from 3 to 50. The polyamide 612 is formed by polymerizing, for example, hexamethylenediamine (HMDA, structure: $H_2N-(CH_2)_6-NH_2$) and dodecanedioic acid (DDA, structure: $HOOC-(CH_2)_{10}-COOH$).

In the following, the polyamide-based thermoplastic elastomer may be simply referred to as "TPA" (ThermoPlastic Amid elastomer).

Conventionally, a thermoplastic elastomer used for manufacturing a resin molded product is sometimes demanded to have high heat resistance and hygrothermal aging resistance.

Specifically, heat resistance refers to a property that a thermoplastic elastomer exhibits a high melting point, and by having high heat resistance, occurrence of plastic deformation under high temperature environment can be suppressed. On the other hand, the hygrothermal aging resistance refers to a property that deterioration due to a change in molecular weight or the like is suppressed even when a thermoplastic elastomer is exposed to a high humidity environment (for example, when it is left in an environment like 80° C. and 95 RH % for 1,000 hours), and by having high hygrothermal aging resistance, deterioration (for example, deterioration of durability) of a resin molded product under high humidity environment can be suppressed.

However, in a polyamide-based thermoplastic elastomer, it is not easy to achieve both heat resistance and hygrothermal aging resistance at high quality.

For example, for a polyamide-based thermoplastic elastomer, a composition using a polyamine for the soft segment and polyamide 6 for the hard segment is conceivable. Polyamide 6 is a polyamide obtained by polycondensation of 6-aminohexanoic acid and has excellent heat resistance, but is deteriorated when it is exposed to high temperature and high humidity environment, and therefore, there is room for improvement on hygrothermal aging resistance. As a polyamide-based thermoplastic elastomer, a composition using a polyamine as a soft segment and polyamide 12 as a hard segment is also considered. Polyamide 12 is a polyamide obtained by polycondensation of 12-aminododecanoic acid, which has excellent hygrothermal aging resistance, but has a low melting point, and therefore, there is room for improvement in heat resistance. On the other hand, as a polyamide-based thermoplastic elastomer, a composition using a polyamine as a soft segment and polyamide 610 as a hard segment is also considered. Polyamide 610 is a polyamide obtained by polycondensation of hexamethylenediamine and sebacic acid (decanedioic acid), and while it has excellent heat resistance, there is still room for improvement in hygrothermal aging resistance.

As described above, it is not easy to obtain a polyamide-based thermoplastic elastomer having both high heat resistance and hygrothermal aging resistance.

On the other hand, in the disclosure, it is found that the polyamide-based thermoplastic elastomer contains polyamide 612 in a hard segment and a polyamine in a soft segment, thereby achieving both high heat resistance and hygrothermal aging resistance. In other words, it is found that a polyamide-based thermoplastic elastomer in which a soft segment containing a polyamine is combined with a hard segment containing polyamide 612 can achieve both excellent heat resistance like that of a polyamide-based thermoplastic elastomer containing polyamide 6 and excellent hygrothermal aging resistance like that of a polyamide-based thermoplastic elastomer containing polyamide 12 at a quality higher than expected.

In the disclosure, it is found that high heat resistance and hygrothermal aging resistance can be achieved at the same time, which is not easily realized by a polyamide-based thermoplastic elastomer in which a hard segment containing polyamide 610 is combined with a soft segment containing a polyamine, a polyamide-based thermoplastic elastomer having a soft segment consisting only of a polymer other than a polyamine (for example, polyol), or the like.

The polyamide-based thermoplastic elastomer according to the disclosure can be suitably used, for example, for a tire. A tire using a thermoplastic polymer material has an advantage that it is easy to manufacture and is low in cost as compared with a conventional tire made of rubber, and by further using the polyamide-based thermoplastic elastomer according to the disclosure as a polymer material in the tire, a tire having high heat resistance and high hygrothermal aging resistance can be obtained.

The tire including the polyamide-based thermoplastic elastomer according to the disclosure is further excellent in durability and has characteristics of being able to suppress the occurrence of cracks (crack resistance).

A tire may be provided with a rubber member formed of a rubber composition as a member such as a tread portion. Such a rubber member and a resin member formed of a polymer material containing a thermoplastic elastomer may be adhered via an adhesive layer, and a resorcinol-formalin-latex-based adhesive (RFL adhesive) is used as an adhesive contained in such an adhesive layer.

The polyamide-based thermoplastic elastomer according to the disclosure has excellent adhesiveness to the RFL adhesive by having the above configuration.

<<Polyamide-Based Thermoplastic Elastomer>>

The polyamide-based thermoplastic elastomer (TPA) according to the disclosure has a hard segment and a soft segment, wherein the hard segment contains a polyamide 612, and the soft segment contains a polyamine. A chain extender such as a dicarboxylic acid or the like may be used for forming a connecting portion of a hard segment and a soft segment in a polyamide-based thermoplastic elastomer.

—Hard Segment—

The hard segment contains at least polyamide 612, in other words, has a structure represented by $\{HN-(CH_2)_6-NHCO-(CH_2)_{10}-CO\}$ (n represents an arbitrary number of repeating units). Polyamide 612 can be synthesized by copolymerization of hexamethylenediamine (HMDA) and dodecanedioic acid (DDA).

DDA/HMDA Ratio

In the polyamide-based thermoplastic elastomer according to the disclosure, the molar ratio of a dodecanedioic acid-derived portion ($OC-(CH_2)_{10}-CO$) (DDA-derived portion) to a hexamethylenediamine-derived portion ($HN-(CH_2)_6-NH$) (HMDA-derived portion) (DDA/HMDA ratio) is preferably in the range of from 73/27 to 52/48, and more preferably, in the range of from 57/43 to 53/47.

When the amount of the dodecanedioic acid-derived portion is 73 moles or less (the amount of hexamethylenediamine-derived portion is 27 moles or more) per 100 moles of the total amount of the dodecanedioic acid-derived portion ($OC-(CH_2)_{10}-CO$) and a hexamethylenediamine-derived portion ($HN-(CH_2)_6-NH$), an effect of suppressing deterioration of heat resistance of the polyamide-based thermoplastic elastomer is exhibited.

On the other hand, when the amount of the dodecanedioic acid-derived portion is 52 moles or more (the amount of hexamethylenediamine-derived portion is 48 moles or less), by suppressing the hygroscopicity of the polyamide-based thermoplastic elastomer, an effect of improving hygrothermal aging resistance is exhibited.

The above DDA/HMDA ratio represents the molar ratio of a portion derived from dodecanedioic acid (DDA) to a portion derived from hexamethylenediamine (HMDA) contained in the molecular chain of the polyamide-based thermoplastic elastomer. The DDA/HMDA ratio can be adjusted to a desired range by setting the charge amounts of dodecanedioic acid (DDA) and hexamethylenediamine (HMDA).

The DDA/HMDA ratio can be measured by using $^1$H-NMR and $^{13}$C-NMR for the polyamide-based thermoplastic elastomer.

The polyamide-based thermoplastic elastomer may contain a resin other than polyamide 612 as a hard segment, and even in this case, the proportion (mass ratio) of polyamide 612 in all hard segments is preferably 50% by mass or more, more preferably 70% by mass or more, and still more preferably 100% by mass.

Examples of other resins which can be additionally used as a hard segment include a polyamide (polyamide 6) obtained by ring-opening polycondensation of s-caprolactam, a polyamide (polyamide 11) obtained by ring-opening polycondensation of undecane lactam, a polyamide (polyamide 12) obtained by ring-opening polycondensation of lauryl lactam, a polyamide (polyamide 12) obtained by polycondensation of 12-aminododecanoic acid, a polyamide (polyamide 66) obtained by polycondensation of a diamine and a dibasic acid, and a polyamide (amide MX) having metaxylene diamine as a constituent unit.

The weight average molecular weight of polyamide 612 contained in the hard segment is preferably from 50,000 to 200,000, and more preferably from 80,000 to 160,000 from the viewpoints of crack resistance and injection moldability.

—Soft Segment—

The soft segment contains at least a polyamine. In other words, the polyamide-based thermoplastic elastomer has a structure derived from a polyamine as a soft segment. A polyamine refers to a compound having a plurality of amino groups ($-NH_2$) in the molecule. In the disclosure, a polyamine may be used singly, or two or more kinds thereof may be used in combination.

The polyamine is not particularly limited, and examples thereof include polyether diamine obtained by reacting ammonia or the like with a terminal of polyether. As the polyether diamine, for example, an ABA-type triblock polyether diamine can be used.

Examples of the "ABA-type triblock polyether diamine" include a polyether diamine represented by the following Formula (N).

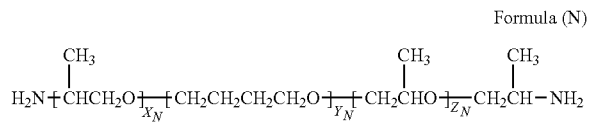

Formula (N)

In Formula (N), $X_N$ and $Z_N$ each independently represent an integer from 1 to 20. $Y_N$ represents an integer from 4 to 50.

In Formula (N), $X_N$ and $Z_N$ are each preferably an integer from 1 to 18, more preferably an integer from 1 to 16, particularly preferably an integer from 1 to 14, and most preferably an integer from 1 to 12. In Formula (N), $Y_N$ is preferably an integer from 5 to 45, more preferably an integer from 6 to 40, particularly preferably an integer from 7 to 35, and most preferably an integer from 8 to 30.

Specific examples of the polyamine that may be contained as a soft segment include a compound obtained by diamination of polyester, polyether, or the like at the terminals, and examples thereof include a compound obtained by diamination of a polyether or a polyester such as polyethylene glycol, polypropylene glycol (PPG), polytetramethylene ether glycol (PTMG), or a polyester polyol, an ABA-type triblock polyetherdiol (such as PPG/PTMG/PPG triblock polyetherdiol), or the like at the terminals.

The polyamide-based thermoplastic elastomer may contain another component than a polyamine as a soft segment, and even in this case, the proportion (mass ratio) of a polyamine in all soft segments is preferably 80% by mass or more, more preferably 90% by mass or more, and still more preferably 100% by mass.

Examples of other components which can be additionally used as a soft segment include polyester and polyether, and examples thereof further include a polyether or a polyester such as polyethylene glycol, polypropylene glycol (PPG), polytetramethylene ether glycol (PTMG), or polyester polyol, and an ABA-type triblock polyether diol (such as PPG/PTMG/PPG triblock polyether diol).

A polymer forming a soft segment may contain a branched saturated diamine having from 6 to 22 carbon atoms, a branched alicyclic diamine having from 6 to 16 carbon atoms, or a diamine such as norbomane diamine as a monomer unit. These branched saturated diamines having from 6 to 22 carbon atoms, branched alicyclic diamine having from 6 to 16 carbon atoms, or norbomane diamine may be used singly or in combination.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane, and 2-methyl-1,8-diaminooctane.

Examples of the branched alicyclic diamine having 6 to 16 carbon atoms include 5-amino-2,2,4-trimethyl-1-cyclopentane methylamine, and 5-amino-1,3,3-trimethylcyclohexanemethylamine. These diamines may be either cis-form or trans-form, and may be a mixture of these isomers.

Examples of the norbomane diamine include 2,5-norbomanedimethylamine, 2,6-norbomanedimethylamine, and mixtures thereof.

Further, a polymer forming the soft segment may contain another diamine compound than the above-described ones as a monomer unit. Examples of other diamine compounds include an aliphatic diamine such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylenediamine, 2,4,4-trimethylhexamethylenediamine, or 3-methylpentane methylenediamine, an alicyclic diamine such as bis(4-aminocyclohexyl)methane, bis(4-aminocyclohexyl)propane, 1,3-bisaminomethylcyclohexane, or 1,4-bisaminomethylcyclohexane, and an aromatic diamine such as metaxylylene diamine or paraxylylene diamine.

These diamines may be used singly or in combination of two or more kinds as appropriate.

The number average molecular weight of a polyamine contained in a soft segment is preferably from 400 to 6,000, more preferably from 600 to 3,000 from the viewpoints of toughness and low temperature impact resistance.

—Chain Extender—

As described above, in addition to a hard segment and a soft segment, a polyamide-based thermoplastic elastomer may have a portion (connecting portion) derived from a chain extender such as a dicarboxylic acid. As the dicarboxylic acid, for example, at least one selected from aliphatic, alicyclic and aromatic dicarboxylic acids or derivatives thereof can be used.

Specific examples of the dicarboxylic acid include a linear aliphatic dicarboxylic acid having from 2 to 25 carbon atoms such as an adipic acid, a decanedicarboxylic acid, an oxalic acid, a succinic acid, a glutaric acid, a pimelic acid, a suberic acid, an azelaic acid, a sebacic acid, or a dodecanedioic acid; an aliphatic dicarboxylic acid such as a dimerized aliphatic dicarboxylic acid having from 14 to 48 carbon atoms obtained by dimerization of an unsaturated fatty acid obtained by fractional distillation of triglyceride and hydrogenated products thereof, an alicyclic dicarboxylic acid such as a 1,4-cyclohexanedicarboxylic acid, and an aromatic dicarboxylic acid such as a terephthalic acid or an isophthalic acid.

HS/SS Ratio

In the polyamide-based thermoplastic elastomer of the disclosure, the mass ratio (HS/SS ratio) of the hard segment (HS) to the soft segment (SS) is preferably from 30/70 to 85/15, and more preferably from 55/45 to 75/25.

When the mass ratio of the hard segment (HS) is 30 or more, the crystallinity of the polyamide-based thermoplastic elastomer is not too low, and an effect that an appropriate modulus of elasticity can be maintained is exhibited. In addition, when the mass ratio of the hard segment (HS) is 50 or more, the modulus of elasticity is increased, whereby shape retention is achieved, and particularly when used for tires, a favorable fittability onto a rim is obtained.

When the mass ratio of the hard segment (HS) is 85 or less, the crystallinity of the polyamide-based thermoplastic elastomer is not too high, and an effect that an appropriate modulus of elasticity can be maintained is exhibited. In addition, when the mass ratio of the hard segment (HS) is 85 or less, the modulus of elasticity is not too high, and particularly when used for a tire, a favorable fittability onto a rim is obtained.

The HS/SS ratio can be adjusted to a desired range by setting the charge amount of a raw material forming the hard segment and a raw material forming the soft segment.

In addition, the HS/SS ratio can be measured by using $^1$H-NMR and $^{13}$C-NMR for the polyamide-based thermoplastic elastomer.

The content of the hard segment and the soft segment in the polyamide-based thermoplastic elastomer is preferably set as appropriate in such a manner that the HS/SS ratio falls within the above range.

When the chain extender is used, the content thereof is preferably set in such a manner that the mole of amino groups (or hdroxyl groups and amino groups) of a monomer forming the soft segment and the mole of carboxyl groups of the chain extender are substantially the same.

The contents of the hard segment, the soft segment, and an optionally used chain extender in the polyamide-based thermoplastic elastomer are selected as appropriate in such a manner that the HS/SS ratio falls within the above range. For example, by setting each charge amount, each desired content can be determined.

Molecular Weight

The weight average molecular weight of the polyamide-based thermoplastic elastomer according to the disclosure is not particularly limited, and is preferably from 20,000 to 250.000, more preferably from 50,000 to 200,000, and still more preferably from 80.000 to 160.000.

When the weight average molecular weight is 20,000 or more, an effect that excellent crack resistance can be obtained by entanglement of molecular chains is exhibited. On the other hand, when the weight average molecular weight is 250,000 or less, the melt viscosity is not too high, and an effect that excellent injection moldability can be obtained is exhibited.

The weight average molecular weight of the polyamide-based thermoplastic elastomer can be measured by gel permeation chromatography (GPC), and for example, GPC (gel permeation chromatography) such as "HLC-8320GPC EcoSEC" manufactured by Tosoh Corporation can be used.

(Synthesis of Polyamide-Based Thermoplastic Elastomer)

A method of synthesizing the polyamide-based thermoplastic elastomer will be described.

For example, in cases in which only polyamide 612 is included as the hard segment and only a polyamine is included as the soft segment, the polyamide-based thermoplastic elastomer can be synthesized by mixing all of hexamethylenediamine (HMDA) and dodecanedioic acid (DDA) which are raw materials of polyamide 612 and a polyamine, and copolymerizing them by a known method (Method 1). The polyamide-based thermoplastic elastomer may be synthesized by first polymerizing hexamethylenediamine (HMDA) and dodecanedioic acid (DDA) by a known method to prepare a polyamide 612, then mixing the polyamide 612 and a polyamine, and copolymerizing them by a known method (Method 2).

When a chain extender (such as an adipic acid or a decanedicarboxylic acid) is further copolymerized, in the case of the Method 1, the polyamide-based thermoplastic elastomer can be synthesized by mixing and copolymerizing all the materials at once, and in the case of the Method 2, the polyamide-based thermoplastic elastomer can be synthesized by mixing a chain extender together with polyamide 612 and a polyamine when they are mixed, and copolymerizing them.

Here, the amino group of hexamethylenediamine (HMDA) reacts with a carboxy group of dodecanedioic acid (DDA). An amino group of the polyamine forming the soft segment reacts with a carboxy group possessed by dodecanedioic acid (DDA) in the case of Method 1, and reacts with a carboxy group derived from dodecanedioic acid (DDA) of polyamide 612 in the case of Method 2. For that reason, it is preferable to adjust the ratio (molar ratio) of hexamethylenediamine (HMDA), dodecanedioic acid (DDA), and a polyamine used for synthesis to 1/1 in the ratio of (DDA)/(HMDA+polyamine).

Examples of the polymerization method include a synthesis method in which melt polymerization at normal pressure is performed and a synthesis method in which melt polymerization at normal pressure and further a melt polymerization under reduced pressure are performed. These synthesis reactions may be carried out either batchwise or continuously. For the above-described synthesis reaction, a batch-type reaction kettle, a one-tank type or multi-tank type continuous reaction apparatus, a tubular continuous reaction apparatus, and the like may be used singly or in combination as appropriate.

In the production of the polyamide-based thermoplastic elastomer, the polymerization temperature is preferably from 150 to 300° C. and more preferably from 200 to 280° C. The polymerization time can be appropriately determined depending on the relationship with the weight average molecular weight of the polyamide-based thermoplastic elastomer to be synthesized and the polymerization temperature, and is preferably, for example, from 0.5 to 30 hours, and more preferably from 3 to 20 hours.

In the production of the polyamide-based thermoplastic elastomer, an additive such as a monoamine or a diamine such as laurylamine, stearylamine, or m-xylylenediamine, or a monocarboxylic acid or a dicarboxylic acid such as acetic acid, benzoic acid, stearic acid, adipic acid, or sebacic acid may be added for the purpose of adjusting the molecular weight and stabilizing the melt viscosity at the time of molding process, if necessary. These additives can be appropriately selected within the range that does not adversely affect an effect of the disclosure depending on the molecular weight, viscosity, or the like of the obtained polyamide-based thermoplastic elastomer.

In the production of the polyamide-based thermoplastic elastomer, a catalyst can be used if necessary. Examples of the catalyst include a compound containing at least one selected from the group consisting of P, Ti, Ge, Zn, Fe, Sn, Mn, Co, Zr, V, Ir, La, Ce, Li, Ca, and Hf.

Examples thereof include an inorganic phosphorus compound, an organic titanium compound, an organic zirconium compound, and an organic tin compound.

Specific examples of the inorganic phosphorus compound include a phosphorus-containing acid such as a phosphoric acid, a pyrophosphoric acid, a polyphosphoric acid, a phosphorous acid, or a hypophosphorous acid, an alkali metal salt of a phosphorus-containing acid, and an alkaline earth metal salt of a phosphorus-containing acid. Examples of the organic titanium compound include titanium alkoxide [titanium tetrabutoxide, titanium tetraisopropoxide, or the like].

Examples of the organic zirconium compound include zirconium alkoxide [zirconium tetrabutoxide (also referred to as "$Zr(OBu)_4$" or "$Zr(OC_4H_9)_4$") or the like].

Examples of the organic tin compound include a distannoxane compound [1-hydroxy-3-isothiocyanate-1,1,3,3-tetrabutyl distannoxane, or the like], tin acetate, dibutyltin dilaurate, and butyltin hydroxide oxide hydrate.

The catalyst addition amount and the catalyst addition timing are not particularly limited as long as the target substance can be obtained promptly.

(Application)

Examples of applications of the polyamide-based thermoplastic elastomer according to the disclosure include a tire, and specific examples thereof include a tire frame and a reinforcing cord layer. The polyamide-based thermoplastic elastomer can also be used as a compounding agent to a rubber member used for a tire.

Examples other than a tire include a tube, a hose, an electric wire coating material, a shoe material, an electric part, and an automotive part.

<<Tire>>

The tire according to the disclosure includes at least the above-described polyamide-based thermoplastic elastomer according to the disclosure.

Examples include a mode in which a resin material constituting a tire frame includes the above-described polyamide-based thermoplastic elastomer and a mode in which a resin material constituting a reinforcing cord layer wound in the circumferential direction around the outer peripheral portion of the tire frame includes the polyamide-based thermoplastic elastomer described above.

(Physical Properties of Resin Material)

Here, preferable physical properties of a resin material containing the polyamide-based thermoplastic elastomer according to the disclosure, which is used in the tire of the disclosure, will be described.

The melting point (or softening point) of the resin material is usually about from 100° C. to 350° C., preferably about from 100° C. to 250° C., and from the viewpoint of productivity of the tire, the melting point (or softening point) is preferably about from 120° C. to 250° C., and more preferably from 120° C. to 230° C.

As described above, by using a resin material having a melting point of 120° C. to 250° C., for example, when a tire frame is formed by fusing a split body (frame piece) thereof, even a frame fused in an ambient temperature range of from 120° C. to 250° C. has sufficient adhesive strength between the tire frame pieces. Therefore, the tire of the disclosure is excellent in running durability such as puncture resistance or abrasion resistance. The heating temperature is preferably from 10° C. to 150° C. higher, and more preferably from 10*C to 100° C. higher than the melting point (or softening point) of the resin material forming the tire frame piece.

The tensile yield strength defined by JS K7113:1995 of the resin material is preferably 5 MPa or more, preferably from 5 MPa to 20 MPa, and more preferably from 5 MPa to 17 MPa. When the tensile yield strength of the resin material is 5 MPa or more, the resin material can withstand deformation due to a load applied to a tire at the time of running or the like.

The tensile yield elongation defined by JIS K7113:1995 of the resin material is preferably 10% or more, more preferably from 100/o to 70%, and still more preferably from 15% to 60%. When the tensile yield elongation of the resin material is 10% or more, the elastic region is large and the fittability onto a rim can be improved.

The tensile elongation at break as defined in JIS K7113:1995 of the resin material is preferably 50% or more, more preferably 100% or more, still more preferably 150% or more, and particularly preferably 200% or more. When the tensile elongation at break of the resin material is 50% or more, the fittability onto a rim is favorable, and it is possible to make the resin material hard to break against a collision.

The deflection temperature under load (at 0.45 MPa load) defined by ISO75-2 or ASTM D648 of the resin material is preferably 50° C. or higher, more preferably 50° C. to 150° C., and still more preferably from 50° C. to 130° C. When the deflection temperature under load of the resin material is 50° C. or higher, deformation of a tire frame can be suppressed even when vulcanization is performed in the production of a tire.

The resin material can be obtained by adding a variety of additives if necessary and appropriately mixing them by a known method (for example, melt mixing). The resin material obtained by melt mixing can be used in pellet form if necessary.

The resin material may contain a thermoplastic elastomer other than a polyamide-based thermoplastic elastomer and optional components (additives), and the content of the polyamide-based thermoplastic elastomer in the disclosure based on the total amount of the resin material is preferably 30% by mass or more, more preferably 50% by mass or more, and particularly preferably 70% by mass or more. Herein, the term "resin" is a concept including a thermoplastic resin and a thermosetting resin, but does not include natural rubber.

The resin material may contain a variety of additives such as rubber, a variety of fillers (for example, silica, calcium carbonate, clay), an antioxidant, oil, a plasticizer, a colorant, a weathering resistance agent, or a reinforcing material, if desired. The content of the additive in the resin material is not particularly limited, and it can be appropriately used as long as an effect of the disclosure is not impaired. When a component other than a resin such as an additive is added to the resin material, the content of the resin component in the resin material is preferably 50% by mass or more, and more preferably 90% by mass or more, based on the total amount of the resin material. The content of the resin component in the resin material is the remainder obtained by subtracting the total content of a variety of additives from the total amount of the resin material.

(Configuration of Tire)

Here, the configuration of the tire according to the disclosure including at least the above-described polyamide-based thermoplastic elastomer will be described with an example.

Examples of the tire configuration of the disclosure include a mode having a circular tire frame formed of a resin material containing the above-described polyamide-based thermoplastic elastomer. Examples of the tire configuration of the disclosure may include a mode in which a rubber member which is formed of a rubber composition is further included, and the rubber member is adhered to the resin member via a layer formed of a composition containing a resorcinol-formalin-latex (RFL)-based adhesive (hereinafter, also referred to as "RFL layer").

According to the tire having the above structure, a resin member including the polyamide-based thermoplastic elastomer and the rubber member can be strongly adhered directly to each other by the RFL layer. For this reason, peeling between (at the interface of) the resin member and the rubber member can be suppressed, and a tire with sufficiently adhered members can be provided. Since the RFL-based adhesive is a water-based adhesive, the tire can be provided by an adhesion method with reduced environmental load. The tire having the above structure may include a layer structure in which a rubber member, an RFL layer, and a resin member are adhered in this order as a part of the tire structure, and it is not necessary that all of the rubber member and the resin member are adhered via the RFL layer.

(Example of Layered Structure)

Members are layered in order of a resin member, an RFL layer, and a rubber member.

Examples of the rubber member in the disclosure include an outer skin rubber such as a tread portion and a base, a ply, a cushion rubber, and a rubber cement.

The resin member in the disclosure is not particularly limited as long as it is a member using a polyamide-based thermoplastic elastomer, and examples thereof include a tire frame. In this case, it is preferable that the RFL layer and the rubber member are layered on a crown portion of the tire frame. In cases in which a reinforcing cord layer formed by coating a reinforcing cord with a resin material containing a polyamide-based thermoplastic elastomer is provided on a tire frame, a reinforcing cord layer or the like arranged on the surface of the tire frame can also be a resin member in the disclosure. In this case, it is preferable that the RFL layer and the rubber member are layered on the reinforcing cord layer.

FIGS. 1A to 1E illustrate specific examples (layer constitution) of a layered structure in the tire of the disclosure. The layer configurations illustrated in FIGS. 1A to 1E are layered and adhered in this order.

The layer structure of the tire of the disclosure is not limited to only the layer configurations illustrated in FIGS. 1A to 1E.

Figure 1B:
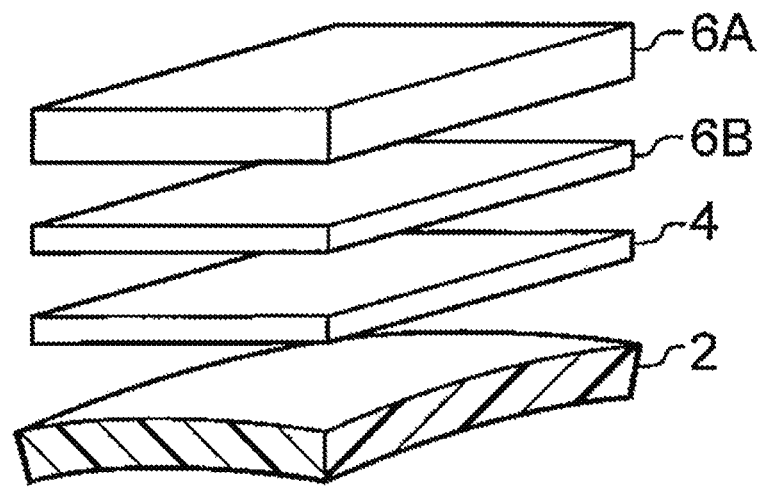
FIG. 1B is a schematic view illustrating an example of a layer configuration of a rubber member and a resin member.

In FIG. 1A, an RFL layer 4 and an outer skin rubber layer 6A are layered in this order on a tire frame 2. In the layer structure, the resin member according to the disclosure is the tire frame 2. The outer skin rubber layer 6A may be, for example, a cement rubber or a cushion rubber, or a tread portion may be directly adhered thereon. For example, as illustrated in FIG. 1B, a rubber cement layer 6B and the outer skin rubber layer 6A (for example, a tread member) can be configured to be layered on the RFL layer 4.

Figure 1C:
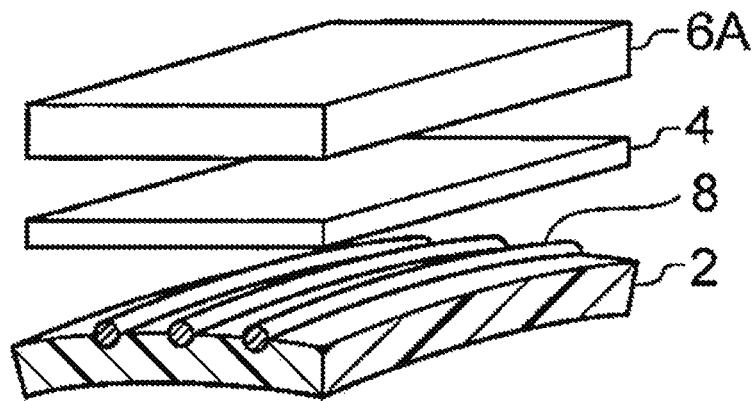
FIG. 1C is a schematic view illustrating an example of a layer configuration of a rubber member and a resin member.
Figure 1D:
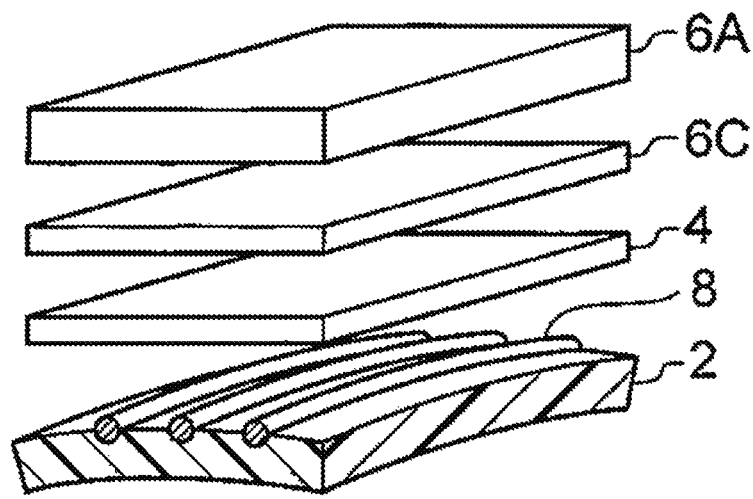
FIG. 1D is a schematic view illustrating an example of a layer configuration of a rubber member and a resin member.
Figure 1E:
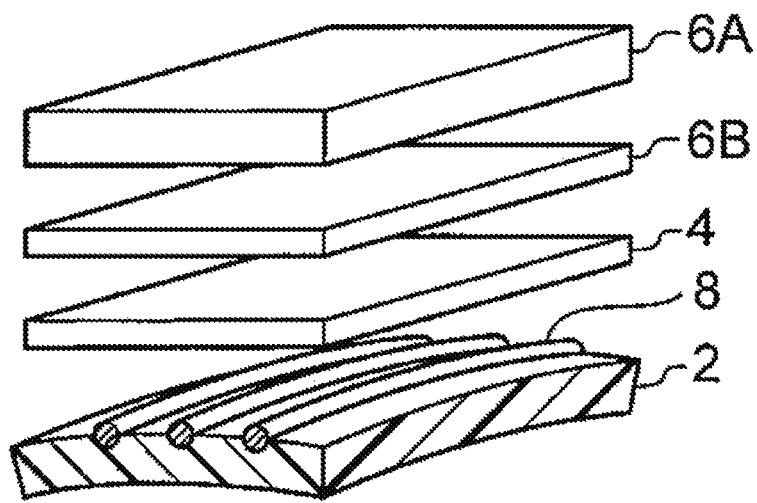
FIG. 1E is a schematic view illustrating an example of a layer configuration of a rubber member and a resin member.

In FIG. 1C, a layer structure is illustrated in which a reinforcing cord layer 8 is arranged on the tire frame 2, the RFL layer 4 is arranged on the surface thereof, and they are combined with the outer skin rubber layer 6A. In this layer structure, at least the tire frame 2 is a resin member according to the disclosure. Further, when the reinforcing cord member forming the reinforcing cord layer 8 contains a polyamide-based thermoplastic elastomer, not only the tire frame 2 but also the reinforcing cord member corresponds to the resin member in the disclosure. In this case, the RFL layer 4 adheres to the surface of the tire frame 2 and the surface of the reinforcing cord layer 8. When the reinforcing cord layer 8 does not contain a polyamide-based thermoplastic elastomer, and the tire frame 2 is adhered to the RFL layer 4, the tire frame 2 may be a resin member according to the disclosure. Also in the layer configuration of FIG. 1C, the outer skin rubber layer 6A may be, for example, a cement rubber or a cushion rubber, or a tread portion may be directly adhered thereon. For example, as illustrated in FIG. 1D, a cushion rubber layer 6C and the outer skin rubber layer 6A (for example, a tread member) can be configured to be layered on the RFL layer 4. As illustrated in FIG. 1E, a rubber cement layer 6B and the outer skin rubber layer 6A (for example, a tread member) can be configured to be layered on the RFL layer 4.

(Rubber Member)

The rubber member in the present disclosure is a member formed of a rubber composition (for example, a rubber composition containing a diene rubber). It is preferable that the rubber contained in the rubber composition is unvulcanized rubber. The rubber is not particularly limited, and examples thereof include natural rubber (NR), a variety of polybutadiene rubbers (BR), polyisoprene rubber (IR), styrene-butadiene copolymer rubber (SBR), and acrylonitrile-butadiene copolymer rubber (NBR). In the rubber member, in addition to the diene rubber, a variety of additives generally blended for tires or other rubber compositions such as carbon black, a vulcanizing agent, a vulcanization accelerator, a variety of oils, an antioxidant, or a plasticizer can be blended. A rubber composition containing them can be kneaded and vulcanized by a general method.

The shape of the rubber member in the disclosure is not particularly limited as long as it is a member formed of a rubber composition containing rubber. Examples of the rubber member include an outer skin rubber, a ply, a cushion rubber, and a rubber cement. Examples of the outer skin rubber include a tread portion and a base. As the ply and the cushion rubber, any member formed of a composition containing rubber can be used at a predetermined site for an appropriate application.

<Rubber Cement>

As described above, a rubber cement may be included as a rubber member constituting the tire of the disclosure. By using a rubber cement, when sticking a plurality of rubber members (for example, outer skin rubber) to each other, sufficient adhesive force or adhesion between the rubber members can be ensured, for example, before the vulcanization step or the like.

The rubber cement is not particularly limited as long as it is, for example, a member formed of a composition containing diene rubber. From the viewpoint of sufficiently exerting an effect of a rubber cement, it is preferable to select appropriately in accordance with the material of the outer skin rubber and the like, and for example, a rubber cement or the like described in JP-A No. 2011-241363 can be used. For example, when a butadiene rubber is used as the outer skin rubber, it is preferable to use butadiene-type splice cement as the rubber cement composition. Further, in this case, it is preferable to use butadiene-type splice cement blended with butadiene rubber. Besides, as a rubber cement composition, a solventless cement in which a liquid elastomer such as liquid butadiene rubber is blended, or a cement containing a blend of isoprene rubber (IR)-butadiene rubber (SBR) as a main component can be used.

(Resin Member)

The resin members included in the tire of the disclosure include a resin member including the polyamide-based thermoplastic elastomer of the disclosure as described above. Since the resin member contains the polyamide-based thermoplastic elastomer of the disclosure, adhesion with an RFL-based adhesive is particularly high, and as a result, the adhesive force between the rubber member and the resin member can be enhanced.

When a reinforcing cord layer containing a reinforcing cord member and the resin material are provided on the tire frame, the reinforcing cord layer is also preferably the resin member according to the disclosure.

(Resorcinol-Formaldehyde-Latex (RFL)-Based Adhesive)

The RFL-based adhesive for forming the RFL layer is an adhesive containing RFL as a main component. RFL is a solution of a composition composed of a resorcinol-formaldehyde condensate obtained by a resol formation reaction and latex. The resorcinol-formaldehyde condensate is a reaction product obtained by subjecting resorcinol and formaldehyde or relatively low molecular weight resorcinol-formaldehyde condensate and formaldehyde to resorcinol-formaldehyde condensation reaction by a so-called resol reaction. When a formaldehyde-derived constituent unit and a resorcinol-derived constituent unit are contained, and a formaldehyde-derived constituent unit is maintained stoichiometrically deficient, an RFL-based adhesive can be maintained soluble at low molecular weight.

Examples of the latex include an acrylic rubber latex, an acrylonitrile-butadiene rubber latex, an isoprene rubber latex, a urethane rubber latex, an ethylene-propylene rubber latex, a butyl rubber latex, a chloroprene rubber latex, a silicone rubber latex, a styrene-butadiene rubber latex, a natural rubber latex, a vinylpyridine-styrene-butadiene rubber latex, a butadiene rubber latex, a butyl rubber latex, a carboxylated butadiene-styrene copolymer latex or a chlorosulfonated polyethylene latex, and a nitrile rubber latex. Among these, vinylpyridine-styrene-butadiene rubber latex is preferable from the viewpoint of adhesiveness with a rubber member. Further, in this case, it is more preferable to use a copolymer rubber latex having a double structure formed by two-stage polymerization of vinyl pyridine, styrene and butadiene. These may be used singly or in combination of two or more kinds thereof, and they may be allowed to coexist in a reaction system for reacting resorcinol and formaldehyde before the reaction.

Copolymer rubber latex having a double structure formed by two-stage polymerization of vinyl pyridine, styrene, and butadiene is a copolymer rubber latex of vinylpyridine, styrene, and butadiene, and can be obtained by (i) polymerizing a monomer mixture having a styrene content of from 10% by mass to 60% by mass, a butadiene content of less than 60% by mass, and a vinyl pyridine content of from 0.5% by mass to 15% by mass, and then, (ii) polymerizing a monomer mixture having a styrene content of from 100/% by mass to 40% by mass, a butadiene content of from 45% by mass to 75% by mass and a vinyl pyridine content of from 5% by mass to 20% by mass with a styrene content lower than the styrene content used in the polymerization in (i).

<Preparation of RFL-Based Adhesive>

The RFL-based adhesive has a structure in which a polymer obtained by resol formation of resorcinol-formaldehyde condensate and latex are sufficiently entangled three-dimensionally. Therefore, in the preparation of the RFL-based adhesive, the resol formation reaction is carried out in a solution in which latex is dispersed.

For the solution used in this case, acidic, neutral, or alkaline water, or an organic solvent such as acetone, alcohol, or the like can be used. The latex has low water solubility in the neutral region of pH, and it is preferable to use alkaline or neutral water in order to sufficiently perform a resorcinol formaldehyde condensation reaction (resol formation reaction) in aging. This resol formation reaction is usually carried out at pH 8.0 or higher, and preferably from 8.5 to 10.0.

Here, the alkaline water is obtained by dissolving sodium hydroxide, lithium hydroxide, potassium hydroxide, ammonium hydroxide, or an organic amine such as monomethylamine or ammonia in water. Any anionic surfactant may be used for dispersion in neutral water by a ball mill or a sand mill. In this case, in order to effectively develop the adhesive force, it is preferable to reduce the amount of the surfactant to such an extent that the dispersed state does not deteriorate.

The molar ratio (F/R) of formaldehyde (F) to resorcinol (R) in the RFL liquid, the ratio (RF/L) of the total mass (RF) of resorcinol and formaldehyde to the solid content mass (L) of the whole latex, and the like can be appropriately selected according to the purpose.

Examples of a method of reacting the resorcinol-formaldehyde condensate obtained by resol formation in a state of being mixed with latex include: a method in which raw materials (resorcinol, a relatively low molecular weight resorcinol-formaldehyde condensate, and formaldehyde) of a resorcinol-formaldehyde condensate and latex are mixed under an alkaline liquid: and a method in which the resol formation reaction is started with raw materials of a resorcinol-formaldehyde condensate in an alkaline liquid without mixing with latex at the start of the reaction, and a reaction intermediate with a low degree of condensation is mixed with latex as much as possible at an early stage of the reaction to continue the reaction.

<Adhesion Method>

Adhesion of a resin member and a rubber member by an RFL-based adhesive can be completed, for example, by applying the RFL-based adhesive to the unvulcanized rubber member or resin member, sticking these, and then performing a heat treatment or the like as necessary.

A pretreatment performed on each member before applying the RFL-based adhesive is preferably appropriately selected as necessary. For example, before the application of the RFL-based adhesive, the adhesion surfaces of the resin member and the rubber member are pretreated in advance, whereby the adhesive force can be strengthened. Examples of such pretreatment methods include electron beam, microwave, corona discharge, plasma discharge, and a degreasing treatment. The pretreatment can also be carried out simply by buffing or filing.

From the viewpoint of adequate adhesion, a site for the pretreatment is preferably either a reinforcing cord layer or a tire frame.

Here, as the pretreatment, a treatment (undercoat treatment) using an adhesive other than a resorcinol-formalin-latex-based adhesive may be performed. The undercoat treatment agent used for the undercoat treatment is not particularly limited as long as it is used when a resin member is more sufficiently adhered to a rubber member with an RFL-based adhesive, and examples thereof include an undercoat composition having a water-soluble polymer containing an epoxy compound and an isocyanate compound described in JP-A No. 2009-191395, an undercoat composition having a copolymer of an alkylated bisphenol and acrylic (methacrylic) acid described in Re-publication of PCT International Publication No. 02-094962, and an undercoat composition containing a vinyl chloride plastisol-based polymer described in JP-A No. H11-001658. The undercoat treatment agent and the resorcinol-formalin-latex-based adhesive may be mixed in the course of application.

The layer thickness of an undercoat layer formed by the undercoat treatment agent is preferably from 1 µm to 15 µm.

By setting the surface roughness of the tire frame to a certain range, the adhesive strength after adhesion can be further enhanced. As the surface roughness of the tire frame, for example, the arithmetic average roughness (Ra) is preferably 0.1 µm or more. When the roughness is 0.1 µm or more, the adhesion area of the tire frame in contact with the RFL-based adhesive increases, and therefore, more adequate adhesion can be attained. From the viewpoint of further reducing the dripping of the RFL-based adhesive, the roughness is preferably 0.5 µm or more, and more preferably 1 µm or more. Similarly, from the viewpoint of increasing the adhesive strength, Ra is preferably 10 µm or less.

Examples of a method of applying an RFL-based adhesive include a dipping method, a bar coating method, a kneader coating method, a curtain coating method, a roller coating method, and a spin coating method.

The adhesive strength can be obtained by preparing a test piece in which each member of a tire is adhered with an RFL-based adhesive and by a method in accordance with JIS-K6854-3: (1999). In this test method, the adhesive strength (kN/m) can be obtained by performing a peeling test using a product in which both side surfaces of one piece of rubber are sandwiched between two pieces of resin and adhered with an RFL-based adhesive as a test piece instead of using a sample having a structure in which a rubber piece corresponding to a rubber member and a resin piece corresponding to a resin member are simply adhered with an RFL-based adhesive and superimposed as a test piece. By visually observing a test piece after the peeling test, a location where a fracture or peeling has occurred can be confirmed. From the viewpoint of imparting a favorable adhesive force, the adhesive strength is desirably 20 kN/m or more. When sufficient adhesive strength is obtained, cohesive failure occurs, and interfacial peeling is suppressed.

When a tire frame and an unvulcanized rubber member are adhered by an RFL-based adhesive, it is preferable to further perform a vulcanization treatment. The vulcanization treatment in this case may be carried out by a known method, and examples thereof include methods described in JP-A No. H11-048264, JP-A No. H11-029658, and JP-A No. 2003-238744. Vulcanization of rubber can be carried out, for example, by appropriately blending a reinforcing material such as carbon black, a filler, a vulcanizing agent, a vulcanization accelerator, a fatty acid or a salt thereof, a metal oxide, a process oil, an antioxidant, or the like into the unvulcanized rubber, kneading using a Banbury mixer, and then heating.

(Reinforcing Cord Layer)

The tire of the disclosure may include a reinforcing cord member wound in the circumferential direction around the outer peripheral portion of a tire frame to form a reinforcing cord layer, and a resin material. Here, as the resin material, a resin material containing the polyamide-based thermoplastic elastomer according to the disclosure described above is preferable.

As described above, when the polyamide-based thermoplastic elastomer of the disclosure is contained in a reinforcing cord layer, not only the adhesiveness between the reinforcing cord layer and a rubber member by an RFL-based adhesive improves, but also a difference in hardness between a tire and the reinforcing cord layer can be made smaller than cases in which the reinforcing cord is fixed with a rubber member (cushion rubber), and therefore, a reinforcing cord member can be fixed in close contact with the tire frame.

In cases in which the reinforcing cord is a steel cord, when attempting to separate the reinforcing cord from a cushion rubber at the time of disposing of a tire, it is difficult to separate the vulcanized rubber from the reinforcing cord only by heating, and on the other hand, the polyamide-based thermoplastic elastomer material can be separated from the reinforcing cord only by heating. For this reason, a polyamide-based thermoplastic elastomer material is advantageous in terms of recyclability of a tire. Polyamide-based thermoplastic elastomer materials usually have lower loss factor (Tan 6) than vulcanized rubber. Therefore, when a reinforcing cord layer contains a large amount of such a resin material, the rolling property of a tire can be improved. Further, polyamide-based thermoplastic elastomer materials having a relatively high modulus of elasticity as compared with vulcanized rubber have advantages such as large in-plane shear rigidity and excellent steering stability and wear resistance during tire running.

The modulus of elasticity (tensile modulus of elasticity specified in JIS K7113:1995) of the polyamide-based thermoplastic elastomer material used for a reinforcing cord layer is preferably set within a range of from 0.1 to 10 times the modulus of elasticity of a thermoplastic resin forming a tire frame. When the modulus of elasticity of the polyamide-based thermoplastic elastomer material is 10 times or less the modulus of elasticity of the polyamide-based thermoplastic elastomer material forming a tire frame, a crown portion is not too hard, and fitting onto a rim becomes easy. When the modulus of elasticity of the polyamide-based thermoplastic elastomer material is 0.1 times or more the modulus of elasticity of a thermoplastic resin material forming the tire frame, a resin forming the reinforcing cord layer is not too soft, and the shear rigidity in the belt plane is excellent, and cornering force is improved.

When a polyamide-based thermoplastic elastomer material is included in the reinforcing cord layer, from the viewpoint of enhancing the extractability (difficulty in pulling out) of the reinforcing cord, the surface of the reinforcing cord member is preferably coated with a polyamide-based thermoplastic elastomer material by 20% or more, and more preferably 50% or more. The content of the polyamide-based thermoplastic elastomer material in the reinforcing cord layer is preferably 20% by mass or more, more preferably 50% by mass or more with respect to the total amount of the materials forming the reinforcing cord layer excluding the reinforcing cord, from the viewpoint of enhancing the extractability of the reinforcing cord.

In order to configure a reinforcing cord layer to contain a resin material, for example, the reinforcing cord layer can be formed in such a manner that at least a part of a reinforcing cord member is embedded in the outer peripheral portion of a tire frame formed from a polyamide-based thermoplastic elastomer material in a cross-sectional view taken along the axial direction of the tire frame. In this case, a resin material containing a polyamide-based thermoplastic elastomer at the outer peripheral portion of a tire frame in which a reinforcing cord member is embedded corresponds to a resin material forming a reinforcing cord layer, and the reinforcing cord layer is formed of a polyamide-based thermoplastic elastomer material forming a tire frame and a reinforcing cord member. When a reinforcing cord layer is configured to contain a resin material, a coated cord member in which a reinforcing cord is coated with the same kind of resin material as or a different kind of resin material from a resin material forming the tire frame may be wound in the circumferential direction of the tire frame. The same kind of resin materials means that the resin materials are in the form of amide type, urethane type, styrene type, or the like.

First Embodiment

Hereinafter, a tire according to the present embodiment will be described with reference to the drawings. In first and second embodiments, a tire frame is referred to as a tire case.

Figure 2A:
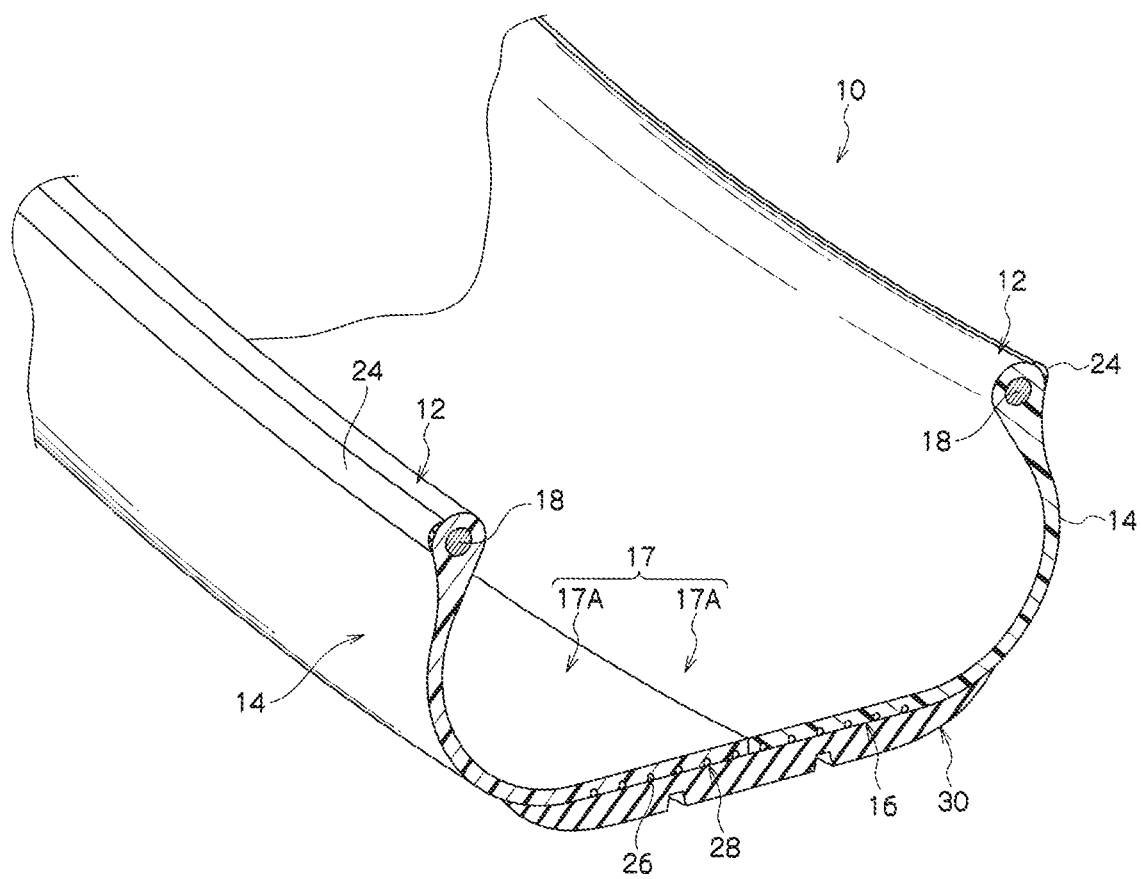
FIG. 2A is a perspective view illustrating a cross-section of a part of a tire according to an embodiment of the disclosure.
Figure 2B:
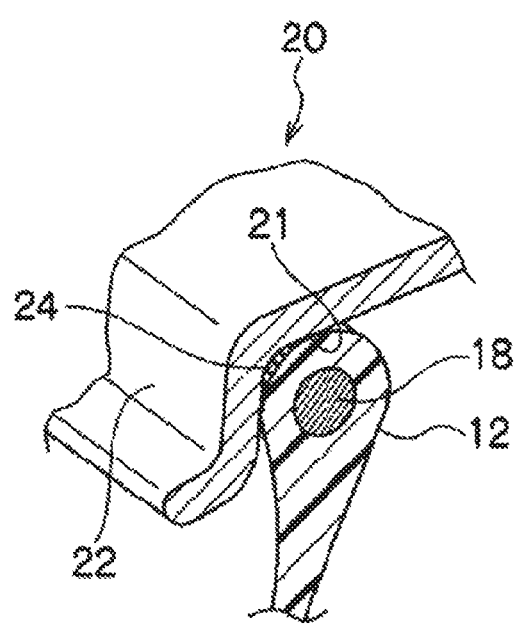
FIG. 2B is a cross-sectional view of a bead portion mounted on a rim.

A tire 10 of the embodiment will be described. FIG. 2A is a perspective view illustrating a cross-section of a part of a tire according to an embodiment of the disclosure. FIG. 2B is a cross-sectional view of a bead portion mounted on a rim. As illustrated in FIG. 2A, the tire 10 of the embodiment has substantially the same cross-sectional shape as a conventional general rubber pneumatic tire.

As illustrated in FIG. 2A, the tire 10 includes a tire case 17 composed of a pair of bead portions 12 contacting a bead seat 21 and a rim flange 22 of a rim 20 illustrated in FIG. 2B, a side portion 14 extending outwardly in the tire radial direction from the bead portion 12, and a crown portion 16 (outer peripheral portion) connecting the outer end in the tire radial direction of one side portion 14 and the outer end in the tire radial direction of the other side portion 14. An RFL layer is located between the crown portion 16 (outer peripheral portion) of FIG. 2A and a tread 30 which is a rubber member, and is formed along the outer periphery of the crown portion 16. When a rubber member is further provided on the outer peripheral portion of the side portion 14, an RFL layer may be formed between the rubber member and the side portion 14. Further, an RFL layer may have a different layer thickness depending on the location. For example, a location where a reinforcing cord 26 is present may be made thick, and a portion near the side portion 14 may be made thin.

In the embodiment, the tire case 17 is formed of a single resin material, that is, a polyamide-based thermoplastic elastomer material, but the disclosure is not limited to this configuration, and a thermoplastic resin material having different characteristics may be used for each site (the side portion 14, the crown portion 16, the bead portion 12, or the like) of the tire case 17, similarly to a conventional general rubber pneumatic tire. A reinforcing material (fibers made of polymer material or metal, a cord, a nonwoven fabric, a woven fabric, or the like) may be embedded in the tire case 17 (for example, the bead portion 12, the side portion 14, the crown portion 16, or the like) to reinforce the tire case 17 with the reinforcing material.

The tire case 17 of the embodiment is formed by joining a pair of tire case half bodies (tire case pieces) 17A formed of a resin material to each other. The tire case half body 17A is formed by facing circular tire case half bodies 17A having the same shape obtained by integrally molding a bead portion 12, a side portion 14, and a half-width crown portion 16 by injection molding or the like to each other and joining them at the tire equatorial plane portion. The tire case 17 is not limited to one formed by joining two members, and may be formed by joining three or more members.

The tire case half body 17A formed of the resin material can be formed by, for example, vacuum forming, pressure forming, injection molding, or melt casting. For this reason, as compared with a conventional case where a tire case is molded with rubber, there is no need to perform vulcanization, the manufacturing process can be greatly simplified, and the molding time can be omitted.

In the embodiment, since the tire case half body 17A has a symmetrical shape, in other words, one tire case half body 17A and the other tire case half body 17A have the same shape, there is also a merit that only one type of mold is used to mold the tire case half body 17A.

In the embodiment, as illustrated in FIG. 2B, a circular bead core 18 made of a steel cord is embedded in the bead portion 12 similarly to a conventional general pneumatic tire. However, the disclosure is not limited to this configuration, and as long as the rigidity of the bead portion 12 is secured and there is no problem in fitting with the rim 20, the bead core 18 can be omitted. The bead core 18 may be formed of an organic fiber cord, a resin-coated organic fiber cord, a hard resin, or the like other than a steel cord.

In the embodiment, a circular sealing layer 24 made of a material having better sealing properties than a resin material forming the tire case 17, such as rubber, is formed at a portion of the bead portion 12 contacting the rim 20 or a portion contacting at least the rim flange 22 of the rim 20. The sealing layer 24 may be formed also at a portion where the tire case 17 (the bead portion 12) and the bead seat 21 contact each other. As a material more excellent in sealing properties than a resin material forming the tire case 17, a material which is softer than a resin material forming the tire case 17 can be used. As a rubber which can be used for the sealing layer 24, it is preferable that the same kind of rubber as a rubber used for the outer surface of a bead portion of a conventional general rubber pneumatic tire is used. Another thermoplastic resin (thermoplastic elastomer) having more excellent sealing properties than the resin material may be used. Examples of such another thermoplastic resin include a resin such as a polyurethane resin, a polyolefin resin, a polystyrene thermoplastic resin, a polyester resin, and a blend of these resins with rubber or an elastomer. A thermoplastic elastomer can also be used, and examples thereof include a polyester-based thermoplastic elastomer, a polyurethane-based thermoplastic elastomer, a polystyrene-based thermoplastic elastomer, a polyolefin-based thermoplastic elastomer, a combination of these elastomers, and a blend with rubber.

As illustrated in FIG. 2A, at the crown portion 16, a reinforcing cord 26 having higher rigidity than that of a resin material forming the tire case 17 is wound in the circumferential direction of the tire case 17. The reinforcing cord 26 is helically wound in a state in which at least a part thereof is embedded in the crown portion 16 in a cross-sectional view taken along the axial direction of the tire case 17 to form a reinforcing cord layer 28. On the outer circumferential side of the reinforcing cord layer 28 in the tire radial direction, a tread 30 which is a material having more excellent wear resistance than a resin material forming the tire case 17, such as a rubber member, is arranged.

Figure 3:
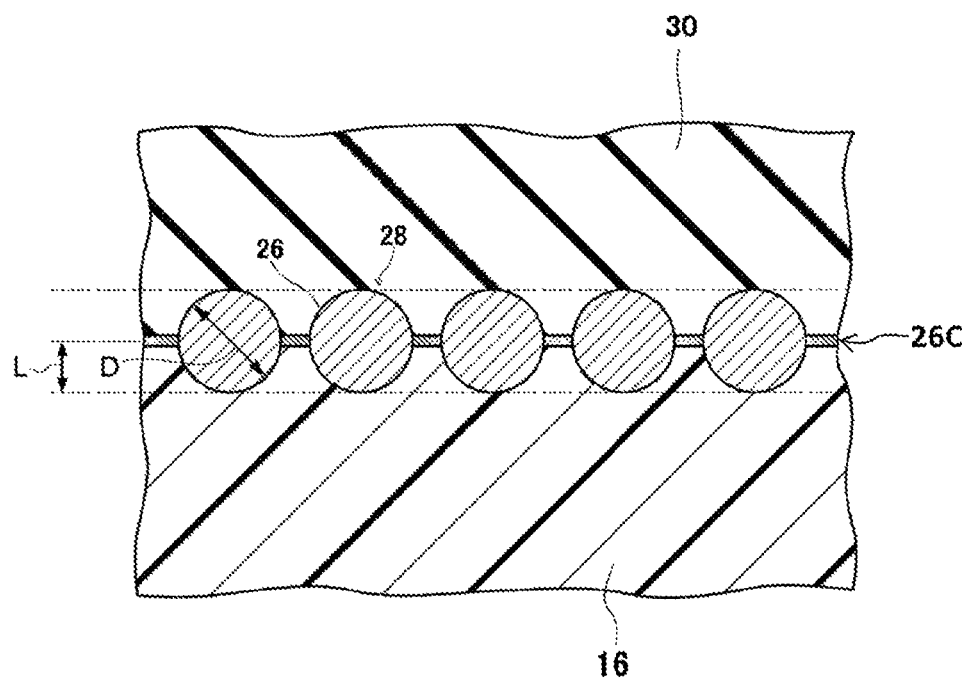
FIG. 3 is a view illustrating a cross-sectional view along a tire rotational axis illustrating a state in which a reinforcing cord is embedded in a crown portion of a tire frame of a tire according to a first embodiment of the disclosure.

The reinforcing cord layer 28 formed by the reinforcing cord 26 will be described with reference to FIG. 3. FIG. 3 is a cross-sectional view taken along the tire rotational axis illustrating a state in which the reinforcing cord 26 is embedded in the crown portion 16 of the tire case of the tire of the embodiment, and further, the tread 30 and the crown portion 16 are adhered via an RFL layer 26C. As illustrated in FIG. 3, the reinforcing cord 26 is helically wound in a state in which at least a part thereof is embedded in the crown portion 16 in a cross-sectional view along the axial direction of the tire case 17, and forms the reinforcing cord layer 28 indicated by a broken line portion in FIG. 3 together with a part of the outer peripheral portion of the tire case 17. A portion embedded in the crown portion 16 of the reinforcing cord 26 is in a state of being in close contact with a resin material forming the crown portion 16 (the tire case 17). As the reinforcing cord 26, a monofilament (single wire) of metal fiber, organic fiber or the like, or a multifilament (stranded wire) obtained by twisting these fibers such as a steel cord obtained by twisting steel fibers can be used. In the embodiment, a steel cord is used as the reinforcing cord 26.

In FIG. 3, the embedding amount L indicates the amount of reinforcing cord 26 embedded in the tire rotation axis direction with respect to the tire case 17 (crown portion 16). The embedding amount L of the reinforcing cord 26 with respect to the crown portion 16 is preferably ⅕ or more, and more preferably more than ½ of the diameter D of the reinforcing cord 26. It is most preferable that the entire reinforcing cord 26 is embedded in the crown portion 16. When the embedding amount L of the reinforcing cord 26 exceeds ½ of the diameter D of the reinforcing cord 26, it is difficult for the reinforcing cord 26 to jump out of an embedded portion due to the size of the reinforcing cord 26. When the entire reinforcing cord 26 is embedded in the crown portion 16, the surface (outer peripheral surface) becomes flat, and as a result, even when a member is placed on the crown portion 16 in which the reinforcing cord 26 is embedded, air inclusion into the peripheral portion of the reinforcing cord can be suppressed. The reinforcing cord layer 28 corresponds to a belt arranged on the outer peripheral surface of a carcass of a conventional rubber pneumatic tire.

As described above, the tread 30 is arranged on the outer circumferential side in the tire radial direction of the reinforcing cord layer 28. As the rubber used for this tread 30, the same kind of rubber as the rubber used for the conventional rubber pneumatic tire is preferably used. Similarly to a conventional rubber pneumatic tire, in the tread 30, a tread pattern composed of a plurality of grooves is formed on the contact surface contacting a road surface.

Hereinafter, a method of manufacturing the tire of the embodiment will be described.

(Tire Case Forming Step)

First, tire case half bodies supported by a thin metal support ring are faced each other. Next, a not illustrated joining mold is set in such a manner to be in contact with the outer peripheral surface of an abutting portion of the tire case half body. Here, the joining mold is configured to press the periphery of a joining portion (abutting portion) of the tire case half body A with a predetermined pressure. Next, the periphery of the joining portion of the tire case half body is pressed at a temperature equal to or higher than the melting point of a thermoplastic resin material forming the tire case. When the joining portion of the tire case half body is heated and pressed by the joining mold, the joining portion melts, and the tire frame half bodies are fused to each other, so that these members are integrated to form the tire case 17. In the embodiment, the joining portion of the tire case half body is heated by using a joining mold, but the disclosure is not limited thereto, and for example, the joining portion may be heated by a separate high-frequency heater or the like, or softened or melted in advance by hot air, infrared irradiation or the like, and pressed by a joining mold to join the tire case half bodies.

(Reinforcing Cord Member Winding Step)

Figure 4:
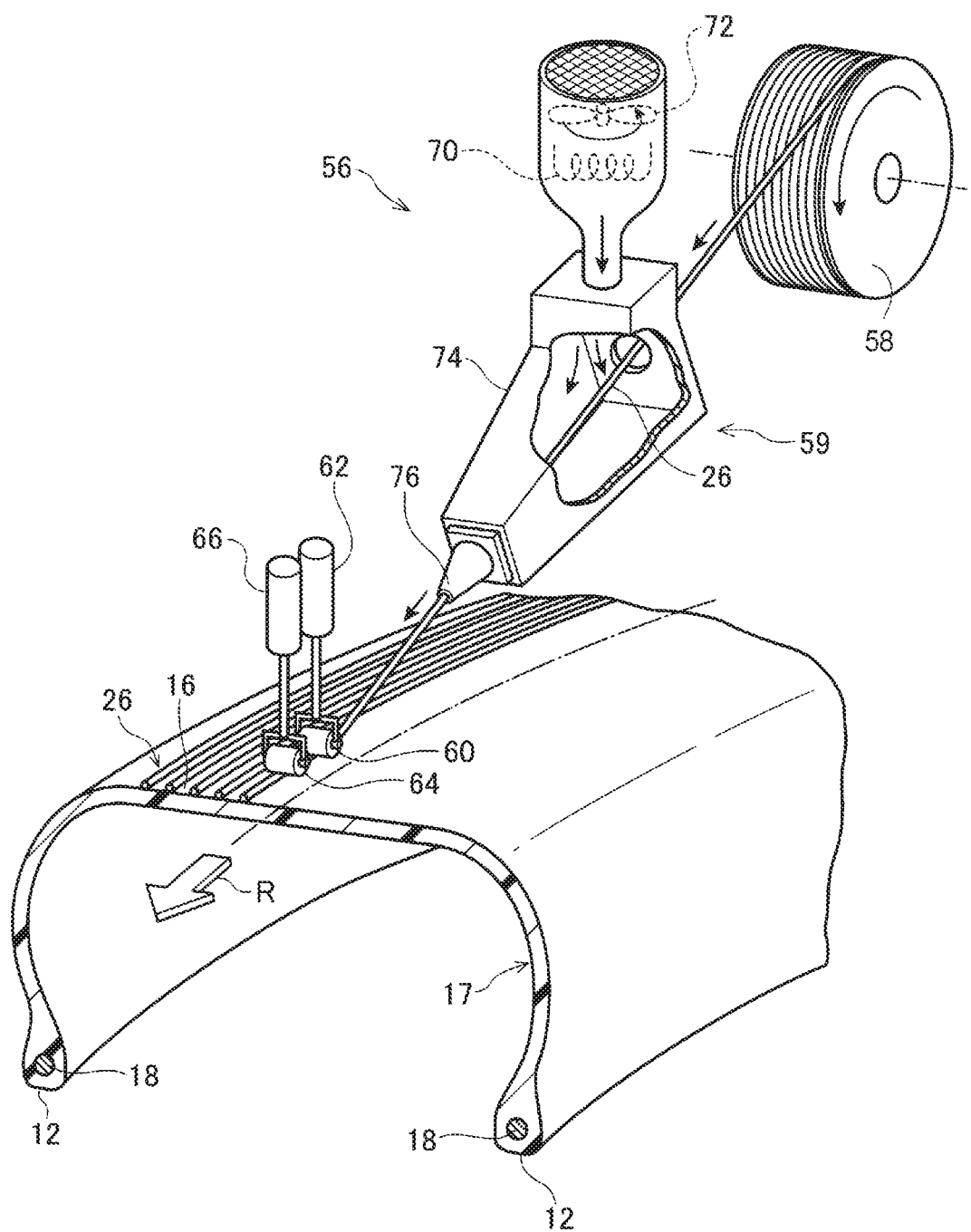
FIG. 4 is an explanatory view for explaining an operation of embedding a reinforcing cord in a crown portion of a tire frame using a cord heating device and a roller.

Next, a reinforcing cord winding step will be described with reference to FIG. 4. FIG. 4 is an explanatory view for explaining an operation of embedding a reinforcing cord in a crown portion of a tire case using a cord heating device and rollers. In FIG. 4, a cord feeding apparatus 56 includes a reel 58 on which the reinforcing cord 26 is wound, the cord heating device 59 arranged on the downstream side of the reel 58 in the cord carrying direction, a first roller 60 arranged on the downstream side in the carrying direction of the reinforcing cord 26, a first cylinder device 62 which moves the first roller 60 toward and away from the tire outer peripheral surface, a second roller 64 arranged on the downstream side in the carrying direction of the reinforcing cord 26 of the first roller 60, and a second cylinder device 66 which moves the second roller 64 toward and away from the tire outer peripheral surface. The second roller 64 can be used as a metallic cooling roller. In the embodiment, the surface of the first roller 60 or the second roller 64 is coated with a fluororesin (Teflon (registered trademark) in the embodiment) in order to suppress adherence of melted or softened thermoplastic resin material. In the embodiment, the cord feeding apparatus 56 is configured to have two rollers of the first roller 60 and the second roller 64, but the disclosure is not limited to this configuration, and the cord feeding apparatus may be configured to have only one of the rollers (that is, one roller).

The cord heating device 59 includes a heater 70 and a fan 72 for generating hot air. The cord heating device 59 includes a heating box 74 into which hot air is supplied and through which the reinforcing cord 26 passes, and an outlet 76 through which the heated reinforcing cord 26 is discharged.

In this step, first, the temperature of the heater 70 of the cord heating device 59 is increased, and the ambient air heated by the heater 70 is sent to the heating box 74 by a wind generated by rotation of the fan 72. Next, the reinforcing cord 26 unwound from the reel 58 is fed into the heating box 74 heated by the hot air and heated (for example, the temperature of the reinforcing cord 26 is heated to about from 100 to 200° C.). The heated reinforcing cord 26 passes through the outlet 76 and is helically wound with a constant tension around the outer peripheral surface of the crown portion 16 of the tire case 17 rotating in the direction of an arrow R in FIG. 4. Here, when the heated reinforcing cord 26 contacts the outer peripheral surface of the crown portion 16, the resin material at a contact portion is melted or softened, and at least a part of the heated reinforcing cord 26 is embedded in the outer peripheral surface of the crown portion 16. At this time, since the heated reinforcing cord 26 is embedded in the melted or softened resin material, there is no gap between the resin material and the reinforcing cord 26, that is, they are brought into close contact with each other. As a result, air inclusion into a portion in which the reinforcing cord 26 is embedded is suppressed. By heating the reinforcing cord 26 to a temperature higher than the melting point (or softening point) of a resin material of the tire case 17, melting or softening of the resin material at a portion which the reinforcing cord 26 contacts is promoted. By doing this, it becomes easier to embed the reinforcing cord 26 on the outer peripheral surface of the crown portion 16, and air inclusion can be effectively suppressed.

The embedding amount L of the reinforcing cord 26 can be adjusted by the heating temperature of the reinforcing cord 26, a tension applied to the reinforcing cord 26, a pressing force by the first roller 60, and the like. In the embodiment, the embedding amount L of the reinforcing cord 26 is set to be ⅕ or more of the diameter D of the reinforcing cord 26. The embedding amount L of the reinforcing cord 26 further preferably exceeds ½ of the diameter D, and most preferably, the entire reinforcing cord 26 is embedded.

In this way, by winding the heated reinforcing cord 26 while embedding it on the outer peripheral surface of the crown portion 16, the reinforcing cord layer 28 is formed on the outer peripheral side of the crown portion 16 of the tire case 17.

Next, an RFL-based adhesive is applied to the surface of the tread 30 of the crown portion 16 of the tire case 17 to be in contact with the crown portion 16. In the application, a commonly used application or coating method or apparatus can be used without particular limitation, and a knife coating method, a bar coating method, a gravure coating method, a spray method, and a dipping method can be used. Among them, a knife coating method, a bar coating method, or a gravure coating method is preferably used from the viewpoint of uniform application and coating of the adhesive.

A band-like tread 30, which is an unvulcanized rubber member, is wound around the outer peripheral surface of the tire case 17 by one round, and the tread 30 is stuck to the outer peripheral surface of the tire case 17 using an RFL-based adhesive. As the tread 30, for example, a precured crown used for a conventionally known retreaded tire can be used. This step is the same step as the step of adhering the precured crown to the outer peripheral surface of the base tire of the retreaded tire.

(Vulcanization Step)

Next, the tire case 17 to which the tread 30 is stuck is stored in a vulcanization can or mold and vulcanized. By performing vulcanization, a chemical bond between a latex rubber and a diene-based rubber of the RFL-based adhesive is newly formed, and as a result, bonding between the tread 30 which is a rubber member and the tire case which is a resin member becomes stronger.

Then, the sealing layer 24 made of a soft material that is softer than a resin material is adhered to the bead portion 12 of the tire case 17 using an adhesive or the like, thereby completing the tire 10.

After completion of the tire 10, an annealing treatment for heating the tire 10 may further be performed. By performing the annealing treatment after completion of the tire, the degree of crystallization of a hard segment of a polyamide-based thermoplastic elastomer contained in a resin material can also be adjusted. The heating temperature in the annealing treatment is preferably from the glass transition temperature to 140° C., and more preferably from 50° C. to 140° C. It is preferable to gradually cool down to room temperature (for example, 25° C.) after heating the tire 10.

(Effects)

In the tire 10 of the embodiment, the tire case 17 is formed of a material containing the polyamide-based thermoplastic elastomer of the disclosure, both high heat resistance and hygrothermal aging resistance can be achieved, the durability is excellent, and occurrence of cracks can also be suppressed. Since the tire case 17 and the tread 30 (rubber member) are adhered by an RFL-based adhesive, adhesion to the RFL-based adhesive is excellent, and therefore, peeling resistance is excellent. Not only the peeling resistance but also the impact resistance and rupture resistance are excellent. Since the tire structure can be further simplified, the weight is lighter than that of a conventional rubber. Therefore, when the tire 10 of the embodiment is applied to an automobile, the durability is excellent. Since the weight of the tire can be reduced, the fuel consumption of an automobile using such a tire can be improved.

The polyamide-based thermoplastic elastomer of the disclosure has high adhesion to the reinforcing cord 26, and is excellent in fixing performance such as welding strength. Therefore, a phenomenon (air inclusion) in which air remains around the reinforcing cord 26 in the reinforcing cord winding step can be particularly suppressed. When adhesion to the reinforcing cord 26 and welding performance to the reinforcing cord 26 are high, and air inclusion into the periphery of the reinforcing cord member is suppressed, movement of the reinforcing cord 26 due to an input or the like during running can effectively be suppressed. By this, for example, even when a member constituting the tire is provided in such a manner as to cover the entire reinforcing cord member on the outer peripheral portion of the tire case, since movement of the reinforcing cord member is suppressed, occurrence of peeling and damage between these members (including the tire case) is suppressed, and the durability of the tire 10 is improved.

In the tire 10 of the present embodiment, the reinforcing cord 26 having a rigidity higher than that of the polyamide-based thermoplastic elastomer material is helically wound in the circumferential direction around the outer peripheral surface of the crown portion 16 of the tire case 17 formed of a polyamide-based thermoplastic elastomer material, and therefore, the puncture resistance, cut resistance, and circumferential rigidity of the tire 10 are improved. By improving the circumferential rigidity of the tire 10, a creep of the tire case 17 formed of a polyamide-based thermoplastic elastomer material is prevented.

Since at least a part of the reinforcing cord 26 is embedded in the outer peripheral surface of the crown portion 16 of the tire case 17 formed of a polyamide-based thermoplastic elastomer material and is in close contact with the surrounding polyamide-based thermoplastic elastomer material in a cross-sectional view (cross-section illustrated in FIG. 3) along the axial direction of the tire case 17, air inclusion at the time of production is suppressed, and movement of the reinforcing cord 26 due to input at the time of running or the like is suppressed. By this, occurrence of peeling or the like in the reinforcing cord 26, the tire case 17, and the tread 30 is suppressed, and the durability of the tire 10 is improved.

As illustrated in FIG. 3, since the embedding amount L of the reinforcing cord 26 is 1/5 or more of the diameter D, air inclusion at the time of production is effectively suppressed, and movement of the reinforcing cord 26 due to input at the time of running or the like is further suppressed.

When the reinforcing cord layer 28 is configured to include a polyamide-based thermoplastic elastomer material as described above, the difference in hardness between the tire case 17 and the reinforcing cord layer 28 can be made small as compared with cases in which the reinforcing cord 26 is fixed with the cushion rubber, and therefore, the reinforcing cord 26 can be further adhered and fixed to the tire case 17. By this, the above-described air inclusion can be effectively prevented, and movement of the reinforcing cord member during running can be effectively suppressed.

In cases in which the reinforcing cord is a steel cord, since the reinforcing cord 26 can be easily separated and recovered from a polyamide-based thermoplastic elastomer material by heating at the time of disposing of a tire, it is advantageous from the viewpoint of recyclability of the tire 10. A resin material usually has lower loss factor (Tan δ) than vulcanized rubber. For this reason, when a reinforcing cord layer contains a large amount of resin material, the rolling property of a tire can be improved. Further, a resin material having a relatively high modulus of elasticity as compared with vulcanized rubber has advantages such as large in-plane shearing rigidity and excellent steering stability and wear resistance during tire running.

Since the tread 30 in contact with a road surface is made of a rubber material having wear resistance higher than that of a polyamide-based thermoplastic elastomer material, the wear resistance of the tire 10 is improved.

Further, since the circular bead core 18 made of a metallic material is embedded in the bead portion 12, the tire case 17, that is, the tire 10 is firmly held with respect to the rim 20 similarly to a conventional rubber pneumatic tire.

Still further, since the sealing layer 24 made of a rubber material having a sealing property higher than that of a polyamide-based thermoplastic elastomer material is provided in a portion of the bead portion 12 contacting the rim 20, the sealing performance between the tire 10 and the rim 20 is improved. By this, as compared with the case of sealing with the rim 20 and a polyamide-based thermoplastic elastomer material, air leakage in the tire is further suppressed. By providing the sealing layer 24, the rim fitting property is also improved.

In the above embodiment, the reinforcing cord 26 is heated to melt or soften a portion of a polyamide-based thermoplastic elastomer material which the heated reinforcing cord 26 contacts, but the disclosure is not limited to this configuration, and the reinforcing cord 26 may be embedded in the crown portion 16 after heating the outer peripheral surface of the crown portion 16 in which the reinforcing cord 26 is embedded by using a hot air generating device without heating the reinforcing cord 26.

In the first embodiment, a heat source of a cord heating device 59 is a heater and a fan, but the disclosure is not limited to this configuration, and the reinforcing cord 26 may be directly heated with radiant heat (for example, infrared rays or the like).

In the first embodiment, the melted or softened portion of the polyamide-based thermoplastic elastomer material in which the reinforcing cord 26 is embedded is forcibly cooled by the metal second roller 64, but the disclosure is not limited to this configuration, and the melted or softened portion of the polyamide-based thermoplastic elastomer material may be forcibly cooled and solidified by directly blowing cold air onto the melted or softened portion of the polyamide-based thermoplastic elastomer material.

In the first embodiment, the reinforcing cord 26 is configured to be heated, but the reinforcing cord 26 may be configured to coat the outer periphery of the reinforcing cord 26 with the same polyamide-based thermoplastic elastomer material as the tire case 17, and in this case, when the coated reinforcing cord is wound around the crown portion 16 of the tire case 17, by heating the coated polyamide-based thermoplastic elastomer material together with the reinforcing cord 26, air inclusion when embedded in the crown portion 16 can be effectively suppressed.

Although it is easy to helically wind the reinforcing cord 26 in manufacturing, a method of making the reinforcing cord 26 discontinuous in the width direction is also considered.

The tire 10 of the first embodiment is a so-called tubeless tire which forms an air chamber between the tire 10 and the rim 20 by mounting the bead portion 12 on the rim 20, but the disclosure is not limited to this configuration, and it may be a complete tube shape.

Although the embodiments of the disclosure have been described above with reference to the embodiments, these embodiments are examples, and various modifications can be made without departing from the scope of the invention. It goes without saying that the scope of the disclosure is not limited to these embodiments.

Second Embodiment

Figure 5A:
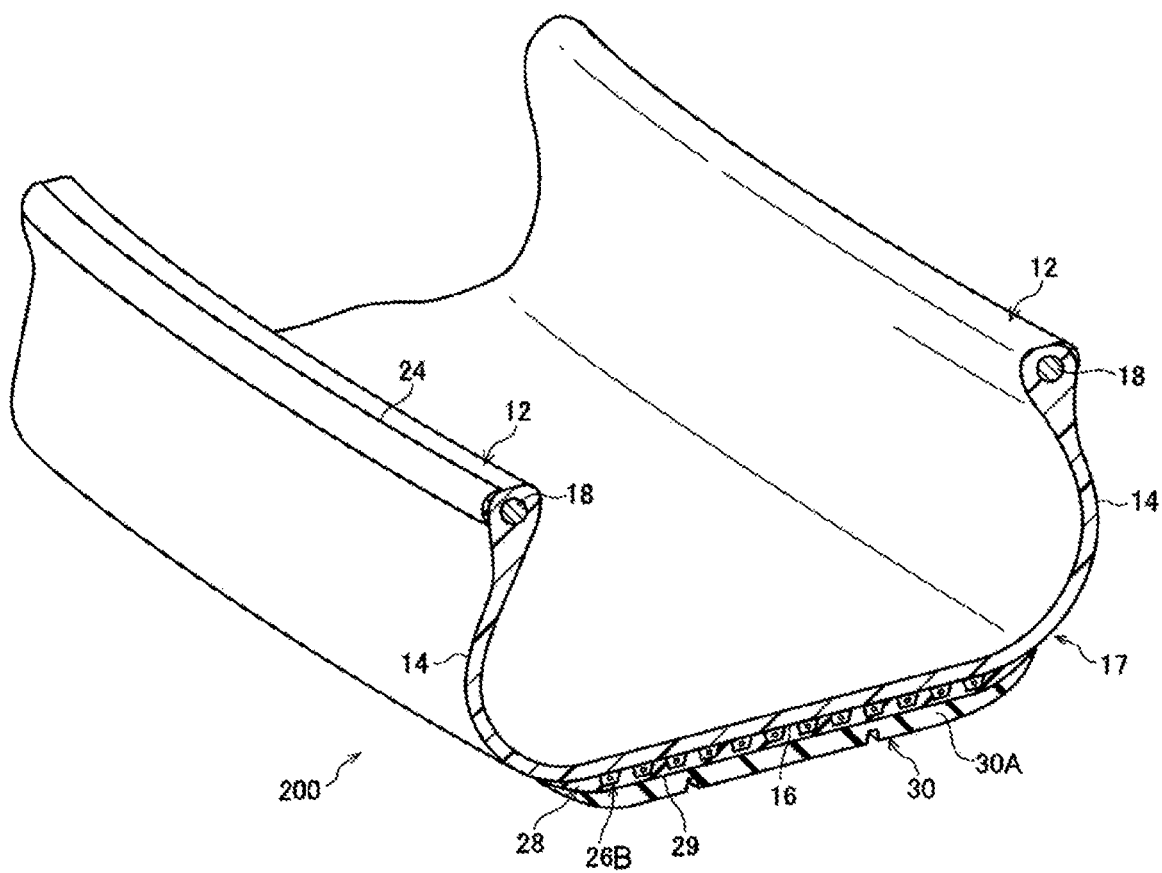
FIG. 5A is a cross-sectional view of a tire according to a second embodiment of the disclosure taken along the tire width direction.
Figure 5B:
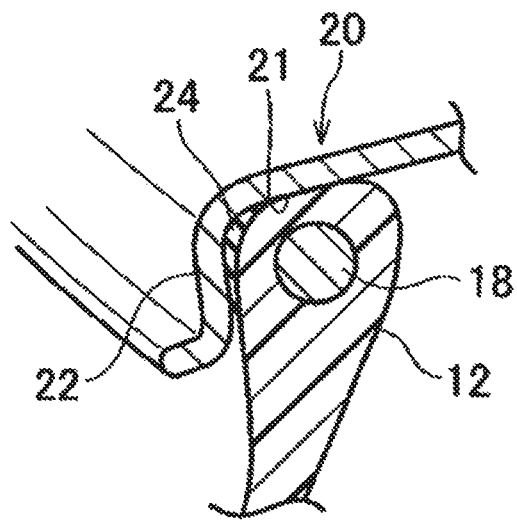
FIG. 5B is an enlarged cross-sectional view of a bead portion along the tire width direction in a state in which a rim is fitted to a tire.
Figure 6:
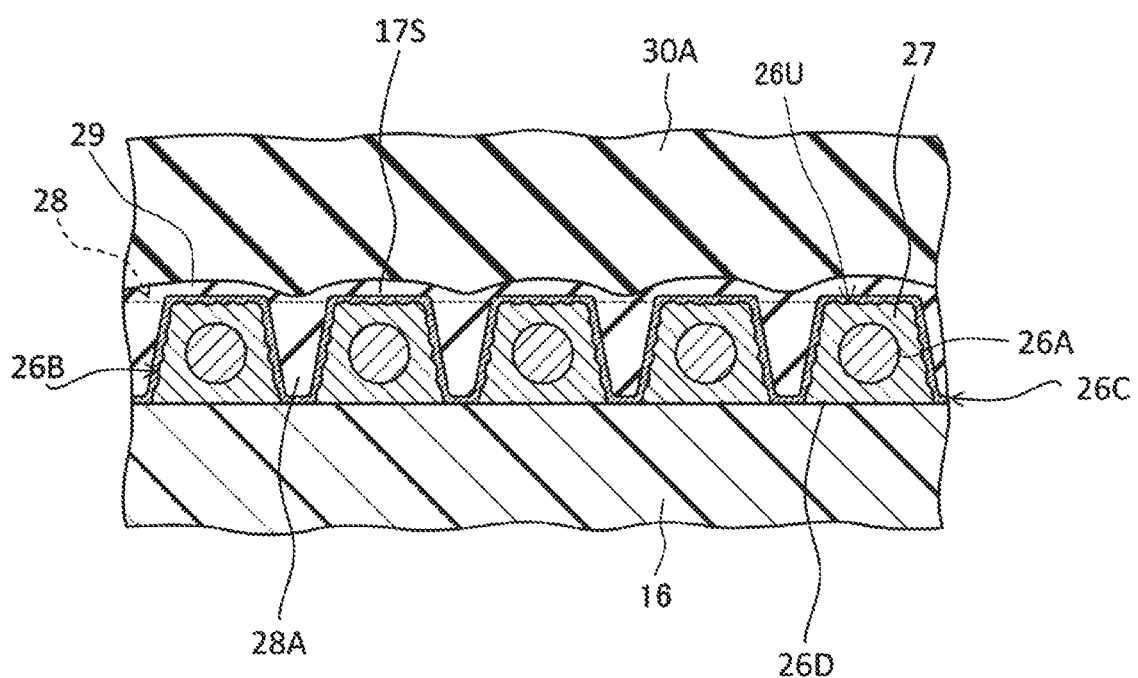
FIG. 6 is a cross-sectional view taken along the tire width direction illustrating a periphery of a reinforcing cord layer of a tire of a second embodiment of the disclosure.

Next, a tire production method and a tire according to a second embodiment of the disclosure will be described according to the drawings. As in the first embodiment described above, the tire of the embodiment has substantially the same cross-sectional shape as a conventional general rubber-made pneumatic tire. Therefore, in the following drawings, the same reference numerals are given to the same configurations as those of the first embodiment. FIG. 5A is a cross-sectional view of a tire of the second embodiment along the tire width direction, and FIG. 5B is an enlarged cross-sectional view of a bead portion along the tire width direction in a state in which a rim is fitted to the tire of the second embodiment. FIG. 6 is a cross-sectional view along the tire width direction illustrating the periphery of the reinforcing cord layer of the tire of the second embodiment.

In the tire of the second embodiment, the tire case 17 is formed of the polyamide-based thermoplastic elastomer (TPA) of the disclosure as in the first embodiment described above. As illustrated in FIGS. 5A and 6, in a tire 200 in the embodiment, the reinforcing cord layer 28 (indicated by a broken line in FIG. 6) configured such that a coated cord member 26B is wound in the circumferential direction is layered on the crown portion 16. The reinforcing cord layer 28 constitutes an outer peripheral portion of the tire case 17 and reinforces the circumferential rigidity of the crown portion 16. The outer peripheral surface of the reinforcing cord layer 28 is in contact with a cushion rubber 28A via the RFL layer 26C.

This coated cord member 26B is formed by coating the cord member 26A having higher rigidity than a polyamide-based thermoplastic elastomer forming the tire case 17 with a polyamide-based thermoplastic elastomer material (hereinafter, referred to as a coating resin material) 27 for coating different from the polyamide-based thermoplastic elastomer forming the tire case 17. The coated cord member 26B and the crown portion 16 are adhered to each other at the contact portion between the coated cord member 26B and the crown portion 16 by the RFL layer 26C formed of an RFL adhesive.

The modulus of elasticity of the coating resin material 27 is preferably set within the range of from 0.1 to 10 times the modulus of elasticity of the resin material forming the tire case 17. When the modulus of elasticity of the coating resin material 27 is 10 times or less the modulus of elasticity of the polyamide-based thermoplastic elastomer material forming the tire case 17, the crown portion is not too hard and fitting onto a rim becomes easy. When the modulus of elasticity of the coating resin material 27 is 0.1 times or more the modulus of elasticity of the polyamide-based thermoplastic elastomer material forming the tire case 17, the resin forming the reinforcing cord layer 28 is not too soft, and the shearing rigidity in the belt plane is excellent, and the cornering force is improved. In the embodiment, as the coating resin material 27, the same material as the polyamide-based thermoplastic elastomer material forming the tire case 17 (that is, the above-described polyamide-based thermoplastic elastomer of the disclosure) is used.

As illustrated in FIG. 6, the coated cord member 26B has a substantially trapezoidal cross-sectional shape. Hereinafter, the top surface (the surface on the outer side in the tire radial direction) of the coated cord member 26B is indicated by 26U and the undersurface (the surface on the inner side in the tire radial direction) is indicated by 26D. In the embodiment, the cross-sectional shape of the coated cord member 26B is configured to be a substantially trapezoidal shape, but the present disclosure is not limited to this configuration, and any shape may be used as long as the cross-sectional shape is a shape excluding a shape that becomes wider from the undersurface 26D side (inner side in the tire radial direction) to the top surface 26U side (outer side in the tire radial direction).

As illustrated in FIG. 6, since the coated cord members 26B are arranged at intervals in the circumferential direction, a gap 28A is formed between the adjacent coated cord members 26B. For this reason, the outer peripheral surface of the reinforcing cord layer 28 has concavities and convexities, and an outer peripheral surface 17S of the tire case 17 in which the reinforcing cord layer 28 constitutes an outer peripheral portion has also concavities and convexities.

On the outer peripheral surface 17S (including concavities and convexities) of the tire case 17, finely roughened concavities and convexities are uniformly formed, and a cushion rubber 29 is bonded to the outer peripheral surface 17S via an RFL layer. In the cushion rubber 29, a rubber portion on the inner side in the radial direction flows into the roughened concavities and convexities.

On the cushion rubber 29 (on the outer peripheral surface), a tread 30 made of a material having more excellent abrasion resistance than a resin material forming the tire case 17, for example, rubber, is bonded.

As the rubber (tread rubber 30A) used for the tread 30, the same kind of rubber as the rubber used for a conventional rubber pneumatic tire is preferably used. In place of the tread 30, a tread formed of another kind of resin material having more excellent abrasion resistance than the resin material forming the tire case 17 may be used. Similarly to a conventional rubber pneumatic tire, in the tread 30, a tread pattern (not illustrated) composed of a plurality of grooves is formed on the contact surface contacting a road surface.

Although the embodiments of the disclosure have been described above with reference to the embodiments, these embodiments are examples, and various modifications can be made without departing from the scope of the invention. It goes without saying that the scope of the disclosure is not limited to these embodiments.

Next, a method of producing a tire of the embodiment will be described.

(Tire Case Forming Step)

First, similarly to the first embodiment, tire case half bodies 17A are formed, and these are heated and pressed by a joining mold to form a tire case 17.

(Reinforcing Cord Member Winding Step)

The tire manufacturing device according to the embodiment is similar to the first embodiment, and in the cord feeding apparatus 56 illustrated in FIG. 4 of the first embodiment, a reel 58 around which the coated cord member 26B having a substantially trapezoidal cross-sectional shape obtained by coating the cord member 26A with the coating resin material 27 (polyamide-based thermoplastic elastomer material) is wound is used.

First, the temperature of the heater 70 is increased, and the ambient air heated by the heater 70 is sent to the heating box 74 by a wind generated by rotation of the fan 72. The coated cord member 26B unwound from the reel 58 is fed into the heating box 74 heated by a hot air, and heated (for example, the temperature of the outer peripheral surface of the coated cord member 26B is equal to or higher than the melting point of the coating resin material 27). Here, when the coated cord member 26B is heated, the coating resin material 27 is melted or softened.

The coated cord member 26B then passes through the outlet 76 and is helically wound with a constant tension around the outer peripheral surface of the crown portion 16 of the tire case 17 rotating in the direction toward the front of the page. At this time, the undersurface 26D of the coated cord member 26B comes into contact with the outer peripheral surface of the crown portion 16. The coating resin material 27 in a molten or softened state of the contact portion spreads on the outer peripheral surface of the crown portion 16, and the coated cord member 26B is welded to the outer peripheral surface of the crown portion 16. By this, the bonding strength between the crown portion 16 and the coated cord member 26B is improved.

(Roughening Treatment Step)

Next, with an unillustrated blasting device, while rotating the tire case 17, a shot material is ejected to the outer peripheral surface 17S of the tire case 17 at a high speed. The ejected shot material collides with the outer peripheral surface 17S, and forms fine roughened concavities and convexities having an arithmetic average roughness Ra of 0.05 mm or more on the outer peripheral surface 17S.

In this way, fine roughened concavities and convexities are formed on the outer peripheral surface 17S of the tire case 17, whereby the outer peripheral surface 17S becomes hydrophilic, and the wettability of a bonding agent described later improves.

(Layering Step)

Next, an RFL-based adhesive is applied to the outer peripheral surface 17S of the tire case 17 subjected to a roughening treatment to form the RFL layer 26C.

Next, the unvulcanized cushion rubber 29 is wound by one round around the outer peripheral surface 17S to which an RFL-based adhesive is applied, a bonding agent such as a rubber cement composition is applied on the cushion rubber 29, and a vulcanized or semi-vulcanized tread rubber 30A is wound therearound for one round to obtain a state of a green tire case.

(Vulcanization Step)

Next, the green tire case is contained in a vulcanization can or mold and vulcanized. At this time, the unvulcanized cushion rubber 29 flows into the RFL layer 26C formed on the outer peripheral surface 17S of the tire case 17 subjected to a roughening treatment. When the vulcanization is completed, a chemical cross-linking structure of the RFL layer 26C and the cushion rubber 29 is formed, thereby improving the adhesive strength. In other words, the adhesive strength between the tire case 17 and the tread 30 is improved via the cushion rubber 29.

Then, when the sealing layer 24 made of a soft material which is softer than a resin material is adhered to the bead portion 12 of the tire case 17 by using an adhesive or the like, the tire 200 is completed.

(Effects)

In the tire 200 of the embodiment, since the tire case 17 formed of a material including the polyamide-based thermoplastic elastomer of the disclosure and the coated cord member 26B formed of a material containing the polyamide-based thermoplastic elastomer of the disclosure are adhered to the cushion rubber 29 via the RFL layer 26C, the tire frame and the coated cord member 26B, and the cushion rubber 29 and the tread 30 are sufficiently adhered. This can improve the durability or the like of the tire 200. In the embodiment, the surface of the tire case 17 and the surface of the coated cord member 26B are configured to be coated with the RFL layer 26C, but the disclosure is not limited thereto, and the RFL layer 26C may be formed on only one of the surface of the tire case 17 and the surface of the coated cord member 26B.

Since the tire 200 of the embodiment is formed by including the polyamide-based thermoplastic elastomer of the disclosure, both high heat resistance and hygrothermal aging resistance can be achieved, the durability is excellent, and occurrence of cracks can also be suppressed. Further, the tire is excellent in tensile modulus of elasticity, tensile strength, and fracture strain, and is light in weight because the structure thereof is simpler than that of a conventional rubber tire. For this reason, the tire 200 of the embodiment has high abrasion resistance and durability.

When the reinforcing cord layer 28 includes the coated cord member 26B as described above, since the difference in hardness between the tire case 17 and the reinforcing cord layer 28 can be made smaller than cases in which the reinforcing cord 26A is simply fixed with the cushion rubber 29, the coated cord member 26B can further be brought into close contact with and fixed to the tire case 17. By this, the above-described air inclusion can be effectively prevented, and movement of the reinforcing cord member during running can be effectively suppressed.

When the reinforcing cord 26A is a steel cord, the cord member 26A can be easily separated and collected from the coated cord member 26B by heating at the time of disposing of the tire, which is advantageous from the viewpoint of recyclability of the tire 200. Since the loss coefficient (Tan 6) of the polyamide-based thermoplastic elastomer is lower than that of a vulcanized rubber, when the reinforcing cord layer 28 contains a large amount of the polyamide-based thermoplastic elastomer, the rolling property of the tire can be improved. The polyamide-based thermoplastic elastomer has advantages such as greater in-plane shear rigidity as compared with vulcanized rubber, and excellent steering stability and abrasion resistance during running of the tire.

In the method of producing a tire of the embodiment, when integrating the tire case 17 and the cushion rubber 29 and tread rubber 30A via the RFL layer 26C, since the outer peripheral surface 17S of the tire case 17 is roughened, the bondability (adhesiveness) is improved by an anchoring effect. Since the resin material forming the tire case 17 is excavated by collision of a shot material, the wettability of the bonding agent is improved. As a result, the bonding agent is held uniformly on the outer peripheral surface 17S of the tire case 17, and the bonding strength between the tire frame 17 and the cushion rubber 29 can be secured.

In particular, even when concavities and convexities are formed on the outer peripheral surface 17S of the tire case 17, a roughening treatment is performed around a concave portion (concave wall and concave bottom) by causing a shot material to collide with a concave portion (gap 28A), thereby securing the bonding strength between the tire case and the cushion rubber 29.

Since the cushion rubber 29 is layered on a roughened region on the outer peripheral surface 17S of the tire case 17, the bonding strength between the tire case 17 and the cushion rubber via the RFL layer 26C can be effectively secured.

Since the reinforcing cord layer 28 constitutes the outer peripheral portion of the tire case 17, the puncture resistance and the cut resistance are improved as compared with cases in which a member other than the reinforcing cord layer 28 constitutes the outer peripheral portion.

Since the reinforcing cord layer 28 is formed by winding the coated cord member 26B, the circumferential rigidity of the tire 200 is improved. By improving the circumferential rigidity, a creep (a phenomenon in which plastic deformation of the tire case 17 increases with time under a certain stress) of the tire case 17 is suppressed, and the pressure resistance against air pressure from the inner side in the tire radial direction is improved.

In the embodiment, concavities and convexities are formed on the outer peripheral surface 17S of the tire case 17, but the disclosure is not limited thereto, and the outer peripheral surface 17S may be configured to be formed flat.

In the tire case 17, the reinforcing cord layer may be formed by covering a coated cord member wound around and adhered to the crown portion of the tire case with a polyamide-based thermoplastic elastomer material for coating. In this case, a coating layer can be formed by discharging a polyamide-based thermoplastic elastomer material for coating in a molten or softened state onto the reinforcing cord layer 28. Without using an extruder, a welding sheet may be heated to a melted or softened state and attached to the surface (outer peripheral surface) of the reinforcing cord layer 28 to form a coating layer.

In the second embodiment, the tire case 17 is configured to be formed by joining case divided bodies (the tire case half bodies 17A), but the disclosure is not limited to this configuration, and the tire case 17 may be integrally formed using a mold or the like.

The tire 200 of the second embodiment is a so-called tubeless tire which forms an air chamber between the tire 200 and the rim 20 by mounting the bead portion 12 on the rim 20, but the disclosure is not limited to this configuration, and the tire 200 may have, for example, a complete tube shape.

In the second embodiment, the cushion rubber 29 is arranged between the tire case 17 and the tread 30, but the disclosure is not limited thereto, and it may be configured not to arrange the cushion rubber 29, that is, it may have a configuration corresponding to the layered structure illustrated in FIG. 1C or FIG. 1E.

In the second embodiment, the coated cord member 26B is helically wound around the crown portion 16, but the present disclosure is not limited thereto, and it may be configured such that the coated cord member 26B is wound discontinuously in the width direction.

When both the tire case 17 and the coated cord member 26B are heated to be in a molten or softened state, both are well mixed, and therefore, the bonding strength is improved. The resin material forming the tire case 17 and the coating resin material 27 forming the coated cord member 26B are preferably thermoplastic materials of the same kind, and particularly preferably the same thermoplastic material.

The outer peripheral surface 17S of the tire case 17 subjected to a roughening treatment may be subjected to a corona treatment, a plasma treatment, or the like to activate the surface of the outer peripheral surface 17S to enhance the hydrophilicity, and then an RFL-based adhesive may be applied thereto.

EXAMPLES

Hereinafter, the disclosure will be described more specifically with reference to Examples. However, the disclosure is not limited thereto.

Example 1

(Synthesis of Polyamide Elastomer)

To a 2-liter reaction vessel equipped with a stirrer, a nitrogen gas inlet, and a condensation water outlet, 68.2 g of dodecanedioic acid (DDA), 1.8 g of hexamethylenediamine (HMDA), 280 g of PPG/PTMG/PPG (a polymer forming a soft segment, a triblock polyether diamine having amino groups at both ends, trade name: ELASTAMINE (registered trademark) RT-1000 manufactured by HUNTSMAN Corporation), 150 g of purified water, and 0.7 g of sodium hypophosphite are charged and mixed. After nitrogen substitution, this mixture is heated to 230° C. under sealing pressure. After the vessel pressure reaches 0.5 MPa, the pressure is gradually released and the mixture is stirred at 230° C. for 5 hours under a nitrogen stream to obtain a polyamide elastomer. The obtained polyamide elastomer is pelletized and injection molded at 240° C. to obtain a sample piece. A variety of measurements are carried out using samples obtained by punching test pieces from this sample piece.

Examples 2 to 9

In Examples 2 and 9, a polyamide elastomer is obtained in the same manner as in Example 1 except that the molar ratio between dodecanedioic acid (DDA) and hexamethylenediamine (HMDA), which are to be raw materials of a hard segment, the mass ratio of the hard segment and a soft segment, and the molecular weight of a polyamide elastomer to be synthesized are changed to those listed in Table 1 below.

In Examples 3-8, a polyamide elastomer was obtained in the same manner as in Example 1 except that the molar ratio between dodecanedioic acid (DDA) and hexamethylenediamine (HMDA), which were to be raw materials of a hard segment, the mass ratio of the hard segment and a soft segment, and the molecular weight of a polyamide elastomer to be synthesized were changed to those listed in Table 1 below; that in Example 7, PPG (1) (a polymer in which hydroxyl groups at both ends of polypropylene glycol had been aminated, ELASTAMINE (registered trademark) RP-2009 manufactured by HUNTSMAN Corporation) was used as a polymer forming the soft segment: and that in Example 8, PPG (2) (a polymer in which hydroxyl groups at both ends of polypropylene glycol had been aminated, JEFFAMINE (registered trademark) D-400 manufactured by HUNTSMAN Corporation) was used as a polymer forming the soft segment.

Comparative Example 1

A polyamide elastomer was obtained in the same manner as in Example 5 except that dodecanedioic acid (DDA) as a raw material of the hard segment was changed to sebacic acid (decanedioic acid) in Example 5.

Comparative Example 2

In a 2-liter reaction vessel equipped with a stirrer, a nitrogen gas inlet, and a condensation water outlet, 500 g of caprolactam, 32.4 g of adipic acid, and 38.7 g of aminohexanoic acid were placed, nitrogen substitution was sufficiently carried out in the vessel, the temperature was then increased to 250° C., and the mixture was allowed to react under a pressure of 0.6 MPa for 4 hours. After relieving the pressure, the mixture was further allowed to react for 1 hour under a nitrogen stream, followed by a water washing step to obtain a white solid which was a polyamide 6 polymer having a desired number average molecular weight of about 3,700.

To 200 g of the obtained polyamide 6 polymer, 54 g of PPG/PTMG/PPG (a polymer forming a soft segment, a triblock polyether diamine having amino groups at both ends, trade name: ELASTAMINE (registered trademark) RT-1000 manufactured by HUNTSMAN Corporation) and 0.5 g of sodium hypophosphite were added, and the mixture was stirred at 230° C. for 4 hours to obtain a white polyamide-based thermoplastic elastomer.

Comparative Example 3

In a 2-liter reaction vessel equipped with a stirrer, a nitrogen gas inlet, and a condensation water outlet, 43.7 g of aminododecanoic acid, 600 g of aminododecanolactam, and 41 g of dodecanedioic acid were placed, nitrogen substitution was sufficiently carried out in the vessel, the temperature was then increased to 280° C., and the mixture was allowed to react under a pressure of 0.4 MPa for 4 hours. After relieving the pressure, the mixture was further allowed to react for 1 hour under a nitrogen stream to obtain a white solid which was a polyamide 12 polymer having a number average molecular weight of 3,000.

To 200 g of the obtained polyamide 12 polymer, 54 g of PPG/PTMG/PPG (a polymer forming a soft segment, a triblock polyether diamine having amino groups at both ends, trade name: ELASTAMINE (registered trademark) RT-1000 manufactured by HUNTSMAN Corporation) and 0.5 g of sodium hypophosphite were added, and the mixture was stirred at 230° C. for 4 hours to obtain a white polyamide-based thermoplastic elastomer.

Comparative Example 4

In a three-necked 2 L-separable flask equipped with a stirrer and a reflux device, 500 mL of ethanol and 170 g of dodecanedioic acid (DDA) are placed and dissolved by stirring at 65° C. To this solution, a solution of 85.6 g of hexamethylenediamine (HMDA) dissolved in 100 mL of ethanol is gradually added, and a precipitated polyamide salt is separated by filtration, washed with ethanol, and then dried under reduced pressure to obtain a polyamide 612 salt.

232 g of the nylon 612 salt prepared from dodecanedioic acid and hexamethylenediamine as described above, 87.5 g of PTMG (polytetramethylene ether glycol; average molecular weight 650) as a polymer forming a soft segment, 31 g of dodecanedioic acid, and 0.3 g of zirconium tetrabutoxide are charged, and nitrogen substitution is carried out. After increasing the temperature to 250° C., stirring is carried out under reduced pressure for 6 hours to obtain a white polyamide-based thermoplastic elastomer.

Evaluations

Heat Resistance

The thermoplastic elastomers obtained in Examples 3-8 and Comparative Examples 1-3 were heated from 0° C. to 250° C. at 10° C./min using a differential scanning calorimetric analysis (DSC) apparatus (DSC Q2000 manufactured by TA Instruments Japan KK). Evaluation criteria are as follows:
A: Melting point was 189° C. or higher.
B: Melting point was from 180° C. to lower than 189° C.
C: Melting point was less than 180° C.

Hygrothermal Aging Resistance

An injection molded sample was allowed to stand for 1,000 hours in a constant temperature and constant humidity tank at 80° C. and 95 RH %, and the molecular weights of the sample before and after leaving were measured by the above-described method. A case in which the ratio of the molecular weight to the pre-test molecular weight was maintained at a value of 90% or more was evaluated as "A", a case in which the ratio was from more than 80% to less than 90% was evaluated as "B", and a case in which the ratio was 80% or less was evaluated as "C".

RFL Adhesiveness

First, an RFL-based adhesive was prepared by the following method.

To 217 g of soft water, 9 g of resorcinol, 12 g of formaldehyde (37% by mass solution, manufactured by Japan Formalin Industrial Co., Ltd.), and 28 g of a 4% by mass solution of NaOH (0.1 mol/L) were added and mixed, and 96 g of styrene-butadiene (SBR) latex [JSR2108, manufactured by JSR Corporation, 40% by mass latex] and 93 g of vinyl pyridine (VP) latex [PYRATEX (registered trademark), 41% by mass latex] which had been mixed in advance were mixed thereto and stirred for 1 hour to obtain a 20% by mass solution of resorcinol-formalin-latex. This was used as an RFL-based adhesive.

One surface of each of two injection pieces was subjected to surface treatment for 1 minute with a sander (sandpaper), and then 10 mg of the RFL-based adhesive was brushed thereon. Next, both side surfaces of one sheet of molded product (rubber piece) having a thickness of 2.5 mm prepared by kneading unvulcanized 100% natural rubber (NR), a vulcanizing agent, a vulcanization accelerator, and a variety of rubber agents with a Banbury mixer and molding by a roll mill were sandwiched by two resin pieces after application of the RFL-based adhesive in such a manner that the application surfaces were in contact, and the two resin pieces were attached to both side surfaces of the sheet of rubber piece, a vulcanization treatment (vulcanization conditions: 145° C., 2 MPa, and 21 minutes) was performed to prepare an evaluation sample. The adhesive strength was determined by a method in accordance with JIS-K6854-3 (1999). Using the test piece as a test sample, the tensile strength (adhesive strength, kN/m) during peeling was determined by pulling the sample at 200 mm/min, and evaluation was made according to the following criteria A: Adhesive strength was 15 kN/m or more.

B: Adhesive strength was from 10 kN/m to less than 15 kN/m.

C: Adhesive strength was from more than 1 kN/m to less than 10 kN/m.

D: Adhesive strength was 1 kN/m or less.

Crack Propagation Resistance

An injection molded sample was punched into a dumbbell shape of JIS-3 to prepare a test sample in which a crack starting point was previously placed in a central portion of the sample. The test sample was repeatedly pulled (17 Hz constant strain 11%) using a servo pulser device manufactured by Shimadzu Corporation, and the number of times until the crack progressed to break the sample was recorded, and evaluation was performed according to the following criteria.

A: Broken at more than 1, 000, 000 times.

B: Broken at more than 100, 000 times to 1, 000, 000 times.

C: Broken at not more than 100, 000 times.

TABLE 1

| | | Example 1 | Example 2 | Example 3 | Example 4 | Example 5 |
|---|---|---|---|---|---|---|
| HS | Structure | PA612 | PA612 | PA612 | PA612 | PA612 |
| SS | Structure | PPG/PTMG/PPG | PPG/PTMG/PPG | PPG/PTMG/PPG | PPG/PTMG/PPG | PPG/PTMG/PPG |
| | Molecular weight | 1000 | 1000 | 1000 | 1000 | 1000 |
| | Terminal functional group | Diamine | Diamine | Diamine | Diamine | Diamine |
| | Bond type | Amide | Amide | Amide | Amide | Amide |
| | HS/SS mass ratio | 20/80 | 50/50 | 60/40 | 65/35 | 75/25 |
| | DDA/HMDA mass ratio | 95/5 | 59/41 | 56/44 | 55/45 | 53/47 |
| | Weight average molecular weight | 112,000 | 123,000 | 136,000 | 128,000 | 133,000 |
| Evaluation | Heat resistance | A (189° C.) | A (202° C.) | A (206° C.) | A (208° C.) | A (210° C.) |
| | Hygrothermal aging resistance | A (90%) | A (94%) | A (95%) | A (97%) | A (97%) |
| | RFL adhesiveness | A | A | A | A | A |
| | Crack propagation resistance | A | A | A | A | A |

| | | Example 6 | Example 7 | Example 8 | Example 9 |
|---|---|---|---|---|---|
| HS | Structure | PA612 | PA612 | PA612 | PA612 |
| SS | Structure | PPG/PTMG/PPG | PPG(1) | PPG(2) | PPG/PTMG/PPG |
| | Molecular weight | 1000 | 2000 | 400 | 1000 |
| | Terminal functional group | Diamine | Diamine | Diamine | Diamine |
| | Bond type | Amide | Amide | Amide | Amide |
| | HS/SS mass ratio | 90/10 | 75/25 | 75/25 | 30/70 |
| | DDA/HMDA mass ratio | 51/49 | 52/48 | 58/42 | 73/27 |
| | Weight average molecular weight | 148,000 | 127,000 | 131,000 | 141,000 |
| Evaluation | Heat resistance | A (213° C.) | A (209° C.) | A (201° C.) | A (195° C.) |
| | Hygrothermal aging resistance | A (98%) | A (92%) | A (91%) | A (92%) |
| | RFL adhesiveness | A | A | A | A |
| | Crack propagation resistance | B | A | A | A |

TABLE 2

|   |   | Comparative Example 1 | Comparative Example 2 | Comparative Example 3 | Comparative Example 4 |
|---|---|---|---|---|---|
| HS | Structure | PA610 | PA6 | PA12 | PA612 |
| SS | Structure | PPG/PTMG/PPG | PPG/PTMG/PPG | PPG/PTMG/PPG | PTMG |
|   | Molecular weight | 1000 | 1000 | 1000 | 650 |
|   | Terminal functional group | Diamine | Diamine | Diamine | Diol |
|   | Bond type | Amide | Amide | Amide | Ester |
|   | HS/SS mass ratio | 75/25 | 75/25 | 75/25 | 75/25 |
| DDA/HMDA mass ratio |   | — | — | — | 53/47 |
| Weight average molecular weight |   | 129,000 | 146,000 | 128,000 | 61,000 |
| Evaluation | Heat resistance | A (212° C.) | A (208° C.) | C (165° C.) | A (208° C.) |
|   | Hygrothermal aging resistance | B (89%) | B (83%) | A (98%) | C (50%) |
|   | RFL adhesiveness | B | D | A | D |
|   | Crack propagation resistance | A | A | A | C |

The components listed in the above Table 1 and Table 2 are as follows.

—Polymer for Soft Segment—

PPG/PTMG/PPG: trade name: JEFFAMINE (registered trademark) RT-1000 manufactured by HUNTSMAN Corporation PPG(1): trade name: ELASTAMINE (registered trademark) RP-2009 manufactured by HUNTSMAN Corporation PPG(2): trade name: JEFFAMINE (registered trademark) D-400 manufactured by HUNTSMAN Corporation As listed in Table 1 and Table 2 above. Comparative Example 1 using polyamine for the soft segment and polyamide 610 for the hard segment had excellent heat resistance but poor hygrothermal aging resistance, Comparative Example 2 using polyamine for the soft segment and polyamide 6 for the hard segment had excellent heat resistance but poor hygrothermal aging resistance, and Comparative Example 3 using polyamine for the soft segment and polyamide 12 for the hard segment had excellent hygrothermal aging resistance but poor heat resistance.

In contrast, Examples using polyamine for the soft segment and polyamide 612 for the hard segment had both heat resistance as excellent as Comparative Examples 1 and 2 and hygrothermal aging resistance as excellent as Comparative Example 3.

The invention claimed is:

1. A tire comprising a polyamide-based thermoplastic elastomer comprising a hard segment and a soft segment, wherein the hard segment contains polyamide 612, and the soft segment contains an ABA-type triblock polyether diamine represented by the following Formula (N):

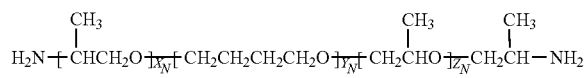

Formula (N)

wherein, in Formula (N), $X_N$ and $Z_N$ each independently represent an integer from 1 to 20, and $Y_N$ represents an integer from 4 to 50.

2. The tire according to claim 1, wherein a mass ratio (HS/SS) of the hard segment (HS) to the soft segment (SS) is from 30/70 to 85/15.

3. The tire according to claim 2, the polyamide 612 comprising a DDA-derived portion represented by (OC—$(CH_2)_{10}$—CO), derived from dodecanedioic acid (DDA), and an HMDA-derived portion represented by (HN—$(CH_2)_6$—NH), derived from hexamethylene diamine (HMDA), wherein a molar ratio (DDA-derived portion/HMDA-derived portion) of the DDA-derived portion to the HMDA-derived portion is from 73/27 to 52/48.

4. The tire according to claim 2, the polyamide-based thermoplastic elastomer having a weight average molecular weight of from 20,000 to 250,000.

5. The tire according to claim 1, the polyamide 612 comprising a DDA-derived portion represented by (OC—$(CH_2)_{10}$—CO), derived from dodecanedioic acid (DDA), and an HMDA-derived portion represented by (HN—$(CH_2)_6$—NH), derived from hexamethylene diamine (HMDA), wherein a molar ratio (DDA-derived portion/HMDA-derived portion) of the DDA-derived portion to the HMDA-derived portion is from 73/27 to 52/48.

6. The tire according to claim 5, the polyamide-based thermoplastic elastomer having a weight average molecular weight of from 20,000 to 250,000.

7. The tire according to claim 1, the polyamide-based thermoplastic elastomer having a weight average molecular weight of from 20,000 to 250,000.

8. The tire according to claim 1, comprising at least a circular tire frame, wherein the tire frame is formed of a resin composition including the polyamide-based thermoplastic elastomer.

9. The tire according to claim 1, comprising at least a circular tire frame and a reinforcing cord layer, wherein the reinforcing cord layer is formed of a reinforcing cord member and a resin composition, the reinforcing cord member is wound in a circumferential direction around an outer peripheral portion of the tire frame, and the resin composition contains the polyamide-based thermoplastic elastomer.

10. The tire according to claim 1, comprising at least a rubber member formed of a rubber composition containing a diene rubber and a resin member formed of a resin composition containing the polyamide-based thermoplastic elastomer, wherein the rubber member is adhered to the resin member via a layer formed of a composition containing a resorcinol-formalin-latex-based adhesive.

11. The tire according to claim 10, wherein the resin member is a circular tire frame.

* * * * *